(12) United States Patent
Ding

(10) Patent No.: US 11,277,744 B2
(45) Date of Patent: Mar. 15, 2022

(54) WI-FI HOTSPOT CONNECTION METHOD AND TERMINAL

(71) Applicant: HUAWEI TECHNOLOGIES CO., LTD., Guangdong (CN)

(72) Inventor: Ji Ding, Shanghai (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 16/640,635

(22) PCT Filed: Sep. 25, 2017

(86) PCT No.: PCT/CN2017/103279
§ 371 (c)(1),
(2) Date: Feb. 20, 2020

(87) PCT Pub. No.: WO2019/037190
PCT Pub. Date: Feb. 28, 2019

(65) Prior Publication Data
US 2020/0187008 A1 Jun. 11, 2020

(30) Foreign Application Priority Data
Aug. 23, 2017 (CN) .......................... 201710729975.1

(51) Int. Cl.
*H04W 12/08* (2021.01)
*H04W 48/16* (2009.01)
(Continued)

(52) U.S. Cl.
CPC ......... *H04W 12/084* (2021.01); *H04L 63/083* (2013.01); *H04W 12/03* (2021.01);
(Continued)

(58) Field of Classification Search
CPC .......................... H04L 63/083; H04W 12/001; H04W 12/003; H04W 12/00516; H04W 12/06;
(Continued)

(56) References Cited

U.S. PATENT DOCUMENTS 8,381,270 B1 * 2/2013 Hsieh .................. H04L 41/0806
726/4
8,913,966 B2 * 12/2014 Bennett ................. H04W 52/04
455/69
(Continued)

FOREIGN PATENT DOCUMENTS

| CN | 104302015 A | 1/2015 |
|----|-------------|--------|
| CN | 105188056 A | 12/2015 |

(Continued)

OTHER PUBLICATIONS

Shunichi Murakami, Wireless Local Area Network Connection Encyclopedia, Apr. 1, 2014, the 1st edition, pp. 203-205 (Year: 2014).*

(Continued)

*Primary Examiner* — Liton Miah
(74) *Attorney, Agent, or Firm* — Womble Bond Dickinson (US) LLP

(57) ABSTRACT

This application provides a Wi-Fi hotspot connection method, which includes: displaying, by a terminal, a first screen that includes an SSID input box and a security selection box; receiving an SSID of a first Wi-Fi hotspot input by a user in the SSID input box; obtaining an encryption manner of the first Wi-Fi hotspot based on the SSID input by the user; displaying a second screen when the encryption manner of the first Wi-Fi hotspot is different from an encryption manner selected from the security selection box, where the second screen includes a password input box; receiving an access password of the first Wi-Fi hotspot input by the user on the second screen; and in response to a user's (Continued)

connection operation on the second screen, connecting to the first Wi-Fi hotspot based on the SSID, the access password, and the obtained encryption manner of the first Wi-Fi hotspot.

20 Claims, 19 Drawing Sheets

(51) Int. Cl.
*H04W 48/20* (2009.01)
*H04L 29/06* (2006.01)
*H04W 48/08* (2009.01)
*H04W 88/08* (2009.01)
*H04W 12/06* (2021.01)
*H04W 12/00* (2021.01)
*H04W 12/084* (2021.01)
*H04W 12/03* (2021.01)

(52) U.S. Cl.
CPC ............ *H04W 12/06* (2013.01); *H04W 48/08* (2013.01); *H04W 48/16* (2013.01); *H04W 48/20* (2013.01); *H04W 88/08* (2013.01)

(58) Field of Classification Search
CPC . H04W 12/08; H04W 12/0804; H04W 48/08; H04W 48/16; H04W 48/20; H04W 84/12; H04W 88/08
See application file for complete search history.

(56) References Cited

U.S. PATENT DOCUMENTS

| | | | | |
|---|---|---|---|---|
| 10,334,438 | B2* | 6/2019 | Iyer | ............ H04L 63/083 |
| 2008/0137860 | A1 | 6/2008 | Silvernail | |
| 2013/0176956 | A1* | 7/2013 | Yamamoto | ............ H04W 76/11 370/329 |
| 2014/0086179 | A1* | 3/2014 | Shi | ............ H04L 5/0037 370/329 |
| 2014/0256317 | A1* | 9/2014 | Zhao | ............ H04W 48/10 455/434 |
| 2016/0249287 | A1* | 8/2016 | Xie | ............ H04W 48/20 |
| 2016/0337951 | A1* | 11/2016 | Ding | ............ H04W 48/20 |
| 2017/0339628 | A1 | 11/2017 | Chen | |
| 2018/0241724 | A1 | 8/2018 | Yu et al. | |
| 2018/0263067 | A1* | 9/2018 | Stephens | ............ H04W 12/08 |
| 2019/0364427 | A1 | 11/2019 | Cu et al. | |
| 2019/0364493 | A1* | 11/2019 | Yu | ............ H04W 76/18 |
| 2020/0177599 | A1* | 6/2020 | Zhong | ............ H04W 76/10 |
| 2020/0187095 | A1* | 6/2020 | Zhao | ............ H04W 12/06 |

FOREIGN PATENT DOCUMENTS

| | | | | | |
|---|---|---|---|---|---|
| CN | 106255106 | A | | 12/2016 | |
| CN | 106572465 | A | | 4/2017 | |
| CN | 106686587 | A | | 5/2017 | |
| CN | 106792622 | A | | 5/2017 | |
| CN | 106792699 | A | | 5/2017 | |
| CN | 106792802 | A | | 5/2017 | |
| CN | 107094293 | A | | 8/2017 | |
| CN | 106686587 | B | * | 1/2020 | ............ H04W 8/005 |
| EP | 3046384 | A1 | * | 7/2016 | ............ H04W 48/18 |
| EP | 3046384 | A1 | | 7/2016 | |
| JP | 2010087910 | A | | 4/2010 | |
| JP | 2010087922 | A | | 4/2010 | |
| JP | 2014078914 | A | * | 5/2014 | ............ H04M 11/00 |
| JP | 2014078914 | A | | 5/2014 | |
| JP | 2016131333 | A | | 7/2016 | |
| KR | 20090113033 | A | * | 10/2009 | ............ H04W 12/08 |
| KR | 20120103567 | A | * | 9/2012 | ............ H04W 48/16 |
| WO | 2016070331 | A1 | | 5/2016 | |
| WO | WO-2018064897 | A1 | * | 4/2018 | ............ H04W 48/08 |

OTHER PUBLICATIONS

Shunichi Murakami, "Wi-Fi Connection Encyclopedia-Wireless Local Area Network Connection Encyclopedia", Shuwa System Co., Ltd., Kazukuni Saito, Apr. 1, 2014, First Ed., total 8 pages (publication showing well-known technology).

Mysterious street corner, How your phone can connect to WiFi that is already hidden, https://jingyan.baidu.com/article/c275f6ba34825ee33d7567f4.html , Feb. 2, 2012, 9 pages.

Android Daily, Encryption mode for Android to obtain Wi-Fi, http://www.voidcn.com/article/p-fkjuwhsz-n.html , Aug. 1, 2015, 3 pages.

* cited by examiner

WI-FI HOTSPOT CONNECTION METHOD AND TERMINAL

This application is a national stage of International Application No. PCT/CN2017/103279, filed on Sep. 25, 2017, which claims priority to Chinese Patent Application No. 201710729975.1, filed on Aug. 23, 2017. Both of the aforementioned applications are hereby incorporated by reference in their entireties.

TECHNICAL FIELD

This application relates to the field of communications technologies, and in particular, to a wireless fidelity (Wi-Fi) hotspot connection method and a terminal.

BACKGROUND

Wireless local area network technologies enable a user to conveniently access a network resource anytime and anywhere in a wireless manner. As one of the wireless local area network (WLAN) technologies, Wi-Fi is widely applied.

A user may usually connect to a Wi-Fi hotspot in the following manner: A terminal searches for nearby Wi-Fi hotspots, and displays service set identifiers (SSID) of all found Wi-Fi hotspots on a Wi-Fi setting screen of the terminal; and in response to selection of an SSID by the user, the terminal receives a Wi-Fi password input by the user, and connects to a selected target Wi-Fi hotspot based on the SSID and the Wi-Fi password.

However, when a Wi-Fi hotspot is configured as a hidden hotspot, the terminal cannot find an SSID of the Wi-Fi hotspot, and consequently cannot display the SSID of the Wi-Fi hotspot on the Wi-Fi setting screen of the terminal. In addition, many users are unfamiliar with a hidden hotspot connection manner. In this case, even if a user knows an SSID and an access password of a hidden hotspot, the user cannot control the terminal to connect to the hidden hotspot. Therefore, user experience is relatively poor.

SUMMARY

This application provides a Wi-Fi hotspot connection method and a terminal. A terminal can connect to a Wi-Fi hotspot regardless of whether the Wi-Fi hotspot is configured as a hidden hotspot, and efficiency of connecting to the Wi-Fi hotspot by the terminal can be improved. Therefore, user experience is improved.

According to a first aspect of this application, a Wi-Fi hotspot connection method is provided, where the method includes: displaying, by a terminal, a first screen that includes an SSID input box and a security selection box for a Wi-Fi hotspot; receiving an SSID of a first Wi-Fi hotspot input by a user in the SSID input box; obtaining an encryption manner of the first Wi-Fi hotspot based on the SSID of the first Wi-Fi hotspot; displaying a second screen when the obtained encryption manner of the first Wi-Fi hotspot is different from an encryption manner selected from the security selection box, where the second screen comprises a password input box; receiving an access password of the first Wi-Fi hotspot input by the user in the password input box; in response to a user's connection operation on the second screen, connecting to the first Wi-Fi hotspot based on the SSID, the access password, and the obtained encryption manner of the first Wi-Fi hotspot.

In this application, when the encryption manner of the first Wi-Fi hotspot is different from the default encryption manner, the terminal does not directly display information indicating a connection failure, but displays the second screen on which the access password can be input. After the terminal receives the access password input by the user, in response to the user's connection operation, the terminal proceeds to connect to the first Wi-Fi hotspot based on the encryption manner obtained by the terminal for the first Wi-Fi hotspot and the SSID and the access password of the first Wi-Fi hotspot. In this case, the user does not need to attempt to successively use encryption manners in the foregoing "security" list to connect to the Wi-Fi hotspot. This can reduce operations performed by the user when the terminal connects to the Wi-Fi hotspot, shorten a time for the terminal to connect to the Wi-Fi hotspot, and improve user experience.

In one embodiment, the obtaining, by the terminal, an encryption manner of the first Wi-Fi hotspot based on the SSID of the first Wi-Fi hotspot may include: in response to a user's connection operation on the first screen, obtaining, by the terminal, the encryption manner of the first Wi-Fi hotspot based on the SSID of the first Wi-Fi hotspot.

It may be understood that, usually, if the user is unfamiliar with a hidden hotspot connection manner, after the user inputs the SSID on the first screen, the user may directly perform the connection operation on the first screen. A result of the connection operation is that the terminal fails to connect to the first Wi-Fi hotspot. However, in this application, even if the user is unfamiliar with the hidden hotspot connection manner and directly performs the connection operation on the first screen, in response to the connection operation, the terminal may obtain the encryption manner of the first Wi-Fi hotspot. Then, the terminal displays the second screen that includes the password input box. In this way, the terminal may connect to the first Wi-Fi hotspot based on the access password input by the user in the password input box, the SSID of the first Wi-Fi hotspot, and the obtained encryption manner.

In one embodiment, considering that some users may be familiar with the hidden hotspot connection manner, after a user familiar with the hidden hotspot connection manner inputs the SSID in the SSID input box, the user may continue to tap the security selection box on the first screen. Usually, in response to the user's tapping operation on the security selection box, the terminal may display the "security" list including a plurality of encryption manner options, so that the user selects an encryption manner. However, the user may not know the encryption manner of the first Wi-Fi hotspot, and cannot select the correct encryption manner from the "security" list.

For this case, before the obtaining, by the terminal, an encryption manner of the first Wi-Fi hotspot based on the SSID of the first Wi-Fi hotspot, the method in this application may include: in response to a user's selection operation on the security selection box on the first screen, displaying, by the terminal, a third screen that includes an encryption manner option and a security obtaining option. Correspondingly, the obtaining, by the terminal, an encryption manner of the first Wi-Fi hotspot based on the SSID of the first Wi-Fi hotspot may include: in response to a user's selection from the security obtaining option, obtaining the encryption manner of the first Wi-Fi hotspot based on the SSID of the first Wi-Fi hotspot.

In this application, after receiving the SSID input by the user on the first screen, in response to the user's selection operation on the security selection box on the first screen, the terminal may display the third screen. Because the third screen includes the encryption manner option and the security obtaining option, even if the user does not know the encryption manner of the first Wi-Fi hotspot, the user may also tap the security obtaining option, so that the terminal automatically obtains the encryption manner of the first Wi-Fi hotspot in response to the user's tapping operation on the security obtaining option. This can reduce operations performed by the user when the terminal connects to the Wi-Fi hotspot, shorten a time for the terminal to connect to the Wi-Fi hotspot, improve efficiency of connecting to the Wi-Fi hotspot by the terminal, and improve user experience.

In one embodiment, after the terminal receives the SSID of the first Wi-Fi hotspot input by the user on the first screen, even if the terminal does not receive the user's selection operation on the security selection box or does not receive the user's connection operation on the first screen as the foregoing two design methods, the terminal may also obtain the encryption manner of the first Wi-Fi hotspot based on the SSID of the first Wi-Fi hotspot. Specifically, the obtaining, by the terminal, an encryption manner of the first Wi-Fi hotspot based on the SSID of the first Wi-Fi hotspot may include: after responding to the user's input of the SSID of the first Wi-Fi hotspot on the first screen, automatically obtaining, by the terminal, the encryption manner of the first Wi-Fi hotspot based on the SSID of the first Wi-Fi hotspot.

In this application, after the terminal receives the SSID input by the user on the first screen, even if the terminal does not receive the user's selection operation on the security selection box or does not receive the user's connection operation on the first screen, directly in response to the operation "the user inputs the SSID of the first Wi-Fi hotspot on the first screen", the terminal may also obtain the encryption manner of the first Wi-Fi hotspot. To be specific, in this application, the terminal may further automatically obtain the encryption manner of the first Wi-Fi hotspot in a manner in which the encryption manner of the Wi-Fi hotspot is imperceptible to the user.

In one embodiment, because when the terminal displays the second screen, the terminal has obtained the encryption manner of the first Wi-Fi hotspot. In this way, the second screen may display the security selection box including the encryption manner of the first Wi-Fi hotspot.

In this application, the terminal may further display the obtained encryption manner on the second screen, so that the user can know which encryption manner is used by the first Wi-Fi hotspot for encryption, that is, which encryption manner is a correct encryption manner used by the first Wi-Fi hotspot. In this way, the user can select the correct encryption manner when controlling another terminal to connect to the first Wi-Fi hotspot.

In one embodiment, the second display may not display the security selection box including the encryption manner of the first Wi-Fi hotspot.

That the terminal does not display the security selection box including the encryption manner does not indicate that the terminal does not obtain the encryption manner of the first Wi-Fi hotspot. It indicates that the terminal does not display the encryption manner to the user on the display screen of the terminal. The terminal still connects to the first Wi-Fi hotspot based on the SSID of the first Wi-Fi hotspot, the encryption manner obtained by the terminal, and an access password of the first Wi-Fi hotspot. To be specific, in this application, the terminal may connect to the Wi-Fi hotspot in a manner in which the encryption manner of the Wi-Fi hotspot is imperceptible to the user.

In one embodiment, the obtaining, by the terminal, an encryption manner of the first Wi-Fi hotspot based on the SSID of the first Wi-Fi hotspot may include: broadcasting, by the terminal, a probe request frame carrying the SSID of the first Wi-Fi hotspot; receiving a probe response frame sent by the first Wi-Fi hotspot, where the probe response frame carries the encryption manner of the first Wi-Fi hotspot; and parsing the received probe response frame to obtain the encryption manner of the first Wi-Fi hotspot. The obtaining, by the terminal, an encryption manner of the first Wi-Fi hotspot based on the SSID of the first Wi-Fi hotspot may include: sending, by the terminal, an encryption manner obtaining request to a cloud server, where the encryption manner obtaining request carries the SSID of the first Wi-Fi hotspot, and the cloud server stores encryption manners of a plurality of Wi-Fi hotspots; and receiving, by the terminal, an encryption manner obtaining response sent by the cloud server, where the encryption manner obtaining response carries the SSID of the first Wi-Fi hotspot.

In one embodiment, the encryption manner selected from the security selection box is an encryption manner input by default (namely unencrypted) or an encryption manner selected by the user. Specifically, before the user inputs the connection operation on the first screen or the second screen, the user does not select an encryption manner from the security selection box. The terminal may consider by default that the encryption manner selected from the security selection box is unencrypted, namely, the encryption manner is N/A. Before the user inputs the connection operation on the first screen or the second screen, the user selects any encryption manner from the security selection box. The encryption manner selected from the security selection box is the encryption manner selected by the user.

According to a second aspect, this application provides a terminal, and the terminal includes: a display unit, an input unit, an obtaining unit, and a connection unit. The display unit is configured to display a first screen, where the first screen includes an SSID input box and a security selection box for a Wi-Fi hotspot. The input unit is configured to receive an SSID of a first Wi-Fi hotspot input by a user in the SSID input box displayed on the display unit. The obtaining unit is configured to obtain an encryption manner of the first Wi-Fi hotspot based on the SSID of the first Wi-Fi hotspot input from the input unit. The display unit is further configured to: display a second screen if the encryption manner of the first Wi-Fi hotspot obtained by the obtaining unit is different from an encryption manner selected from the security selection box, where the second screen includes a password input box. The input unit is further configured to receive an access password of the first Wi-Fi hotspot input by the user in the password input box displayed on the display unit. The connection unit is configured to: in response to a user's connection operation on the second screen displayed on the display unit, connect to the first Wi-Fi hotspot based on the SSID of the first Wi-Fi hotspot input from the input unit, the access password of the first Wi-Fi hotspot input from the input unit, and the encryption manner obtained by the obtaining unit for the first Wi-Fi hotspot input from the input unit.

In one embodiment, the obtaining unit is specifically configured to: in response to a user's connection operation on the first screen displayed on the display unit, obtain the encryption manner of the first Wi-Fi hotspot based on the SSID of the first Wi-Fi hotspot.

In one embodiment, the display unit is further configured to: in response to a user's selection operation on the security selection box on the first screen, display a third screen, where the third screen includes an encryption manner option and a security obtaining option. The obtaining unit is specifically configured to: in response to a user's selection from the security obtaining option displayed on the display unit, obtain the encryption manner of the first Wi-Fi hotspot based on the SSID of the first Wi-Fi hotspot.

In one embodiment, the obtaining unit is specifically configured to: after responding to the user's input of the SSID of the first Wi-Fi hotspot on the first screen displayed on the display unit, automatically obtain the encryption manner of the first Wi-Fi hotspot based on the SSID of the first Wi-Fi hotspot.

In one embodiment, the obtaining unit is specifically configured to: broadcast a probe request frame, where the probe request frame carries the SSID of the first Wi-Fi hotspot; receive a probe response frame sent by the first Wi-Fi hotspot, where the probe response frame carries the encryption manner of the first Wi-Fi hotspot; and parse the probe response frame to obtain the encryption manner of the first Wi-Fi hotspot.

In one embodiment, the obtaining unit is specifically configured to: send an encryption manner obtaining request to a cloud server, where the encryption manner obtaining request carries the SSID of the first Wi-Fi hotspot, and the cloud server stores encryption manners of a plurality of Wi-Fi hotspots; and receive an encryption manner obtaining response sent by the cloud server, where the encryption manner obtaining response carries the SSID of the first Wi-Fi hotspot.

In one embodiment, the encryption manner selected from the security selection box is an encryption manner input by default or an encryption manner selected by the user.

According to a third aspect, this application provides a terminal, and the terminal includes a processor, a memory, a touchscreen, and a communications interface. The memory, the touchscreen, and the communications interface are coupled to the processor. The communications interface is configured to communicate with another terminal. The another device includes a wireless fidelity Wi-Fi hotspot, the memory is configured to store computer program code, and the computer program code includes a computer instruction. When the processor executes the computer instruction, the touchscreen is configured to display a first screen, where the first screen includes an SSID input box and a security selection box for the Wi-Fi hotspot. The processor is configured to: receive an SSID of a first Wi-Fi hotspot input by a user in the SSID input box displayed on the touchscreen, and obtain an encryption manner of the first Wi-Fi hotspot based on the SSID of the first Wi-Fi hotspot. The touchscreen is further configured to: display a second screen if the encryption manner of the first Wi-Fi hotspot obtained by the processor is different from an encryption manner selected from the security selection box, where the second screen includes a password input box. The processor is further configured to receive an access password of the first Wi-Fi hotspot input by the user in the password input box displayed on the touchscreen. The processor is further configured to: in response to a user's connection operation on the second screen, connect to the first Wi-Fi hotspot based on the SSID, the access password, and the obtained encryption manner of the first Wi-Fi hotspot through the communications interface.

In one embodiment, the processor is further configured to: in response to a user's connection operation on the first screen displayed on the touchscreen, obtain the encryption manner of the first Wi-Fi hotspot based on the SSID of the first Wi-Fi hotspot.

In one embodiment, the first screen displayed on the touchscreen further includes the security selection box. The touchscreen is further configured to: before the processor obtains the encryption manner of the first Wi-Fi hotspot based on the SS ID of the first Wi-Fi hotspot, in response to a user's selection operation on the security selection box on the first screen, display a third screen, where the third screen includes an encryption manner option and a security obtaining option. The processor is further configured to: in response to a user's selection from the security obtaining option displayed on the touchscreen, obtain the encryption manner of the first Wi-Fi hotspot based on the SSID of the first Wi-Fi hotspot.

In one embodiment, the processor is further configured to: after responding to the user's input of the SSID of the first Wi-Fi hotspot on the first screen displayed on the touchscreen, automatically obtain the encryption manner of the first Wi-Fi hotspot based on the SSID of the first Wi-Fi hotspot.

In one embodiment, the communications interface is further configured to: broadcast a probe request frame, where the probe request frame carries the SSID of the first Wi-Fi hotspot; and receive a probe response frame sent by the first Wi-Fi hotspot, where the probe response frame carries the encryption manner of the first Wi-Fi hotspot. The processor is further configured to parse the probe response frame received through the communications interface, to obtain the encryption manner of the first Wi-Fi hotspot.

In one embodiment, the communications interface is further configured to: send an encryption manner obtaining request to a cloud server, where the encryption manner obtaining request carries the SSID of the first Wi-Fi hotspot, and the cloud server stores encryption manners of a plurality of Wi-Fi hotspots; and receive an encryption manner obtaining response sent by the cloud server, where the encryption manner obtaining response carries the SSID of the first Wi-Fi hotspot.

In one embodiment, the encryption manner selected from the security selection box is an encryption manner input by default or an encryption manner selected by the user.

According to a fourth aspect, this application provides a computer storage medium, where the computer storage medium includes a computer instruction, and when the computer instruction is run on a terminal, the terminal is enabled to perform the Wi-Fi hotspot connection method according to the first aspect and any embodiment of the first aspect.

According to a fifth aspect, this application provides a computer program product. When the computer program product is run on a computer, the computer is enabled to perform the Wi-Fi hotspot connection method according to the first aspect and any embodiment of the first aspect.

DESCRIPTION OF EMBODIMENTS

The terms "first" and "second" mentioned below are merely intended for description, and shall not be understood as an indication or implication of relative importance or implicit indication of a quantity of indicated technical features. Therefore, a feature limited by using "first" or "second" may explicitly or implicitly include one or more features. In the descriptions of this application, unless otherwise specified, "a plurality of" means two or more than two.

This application provides a Wi-Fi hotspot connection method and a terminal. The method may be applied to a process in which a terminal connects to a Wi-Fi hotspot, and may be particularly applied to a process in which the terminal connects to a Wi-Fi hotspot configured as a hidden hotspot. Certainly, the terminal may also connect to a non-hidden hotspot by using the Wi-Fi hotspot connection method provided in this application. In this application, that a Wi-Fi hotspot is configured as a hidden hotspot specifically means that a function of broadcasting an SSID by the Wi-Fi hotspot by using a wireless signal is disabled, in other words, the hidden hotspot does not broadcast the wireless signal carrying the SSID of the Wi-Fi hotspot. The wireless signal may be a Wi-Fi beacon (Beacon) frame.

The terminal in this application may be an electronic device having a Wi-Fi connection function. For example, the terminal may be a mobile phone (for example, a mobile phone 100 shown in FIG. 1A and FIG. 1B, a tablet computer, a personal computer (PC), a personal digital assistant (PDA), a smartwatch, a netbook, or a wearable electronic device. A specific form of the device is not particularly limited in this application.

Figures 1A, 1B:
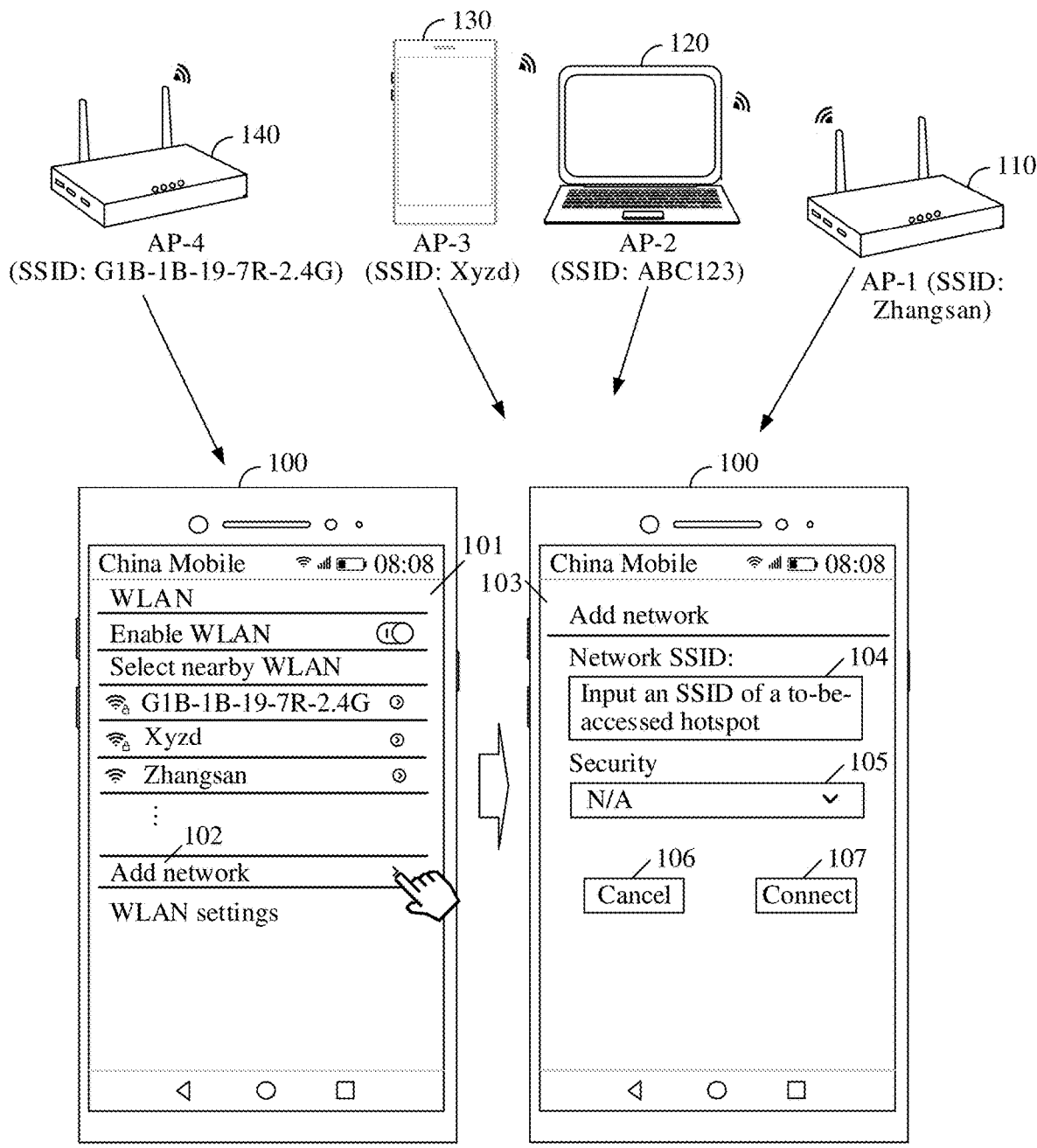
FIG. 1A and FIG. 1B are schematic diagrams of a network architecture to which a Wi-Fi hotspot connection method is applied according to this application.

FIG. 1A and FIG. 1B are a schematic diagram of a Wi-Fi network architecture to which a Wi-Fi hotspot connection method is applied according to this application. As shown in FIG. 1A and FIG. 1B, the Wi-Fi network architecture may include a mobile phone 100, a router 110 (namely, a Wi-Fi hotspot-1), a notebook computer 120 (namely, a Wi-Fi hotspot-2), a mobile phone 130 (namely, a Wi-Fi hotspot-3), and a router 140 (namely, a Wi-Fi hotspot-4). An SSID of the Wi-Fi hotspot-1 is Zhangsan, an SSID of the Wi-Fi hotspot-2 is ABC123, an SSID of the Wi-Fi hotspot-3 is Xyzd, and an SSID of the Wi-Fi hotspot-4 is G1B-1B-19-7R-2.4G.

The router 110, the notebook computer 120, the mobile phone 130, and the router 140 are located nearby the mobile phone 100, and may each broadcast a Wi-Fi beacon frame, so that a nearby terminal (for example, the mobile phone 100) can detect the Wi-Fi beacon frame of the Wi-Fi hotspot and connect to the Wi-Fi hotspot. The Wi-Fi beacon frame broadcast by the Wi-Fi hotspot carries the SSID of the Wi-Fi hotspot. For example, the Wi-Fi beacon frame broadcast by the router 140 carries G1B-1B-19-7R-2.4G.

After finding the Wi-Fi beacon frame broadcast by the Wi-Fi hotspot nearby the terminal, the terminal may display, on a "Wi-Fi setting" screen of the terminal, the SSID of the Wi-Fi hotspot found by the terminal. However, when a Wi-Fi hotspot is configured as a hidden hotspot, the terminal cannot find the Wi-Fi hotspot and display an SSID of the Wi-Fi hotspot.

Figure 2:
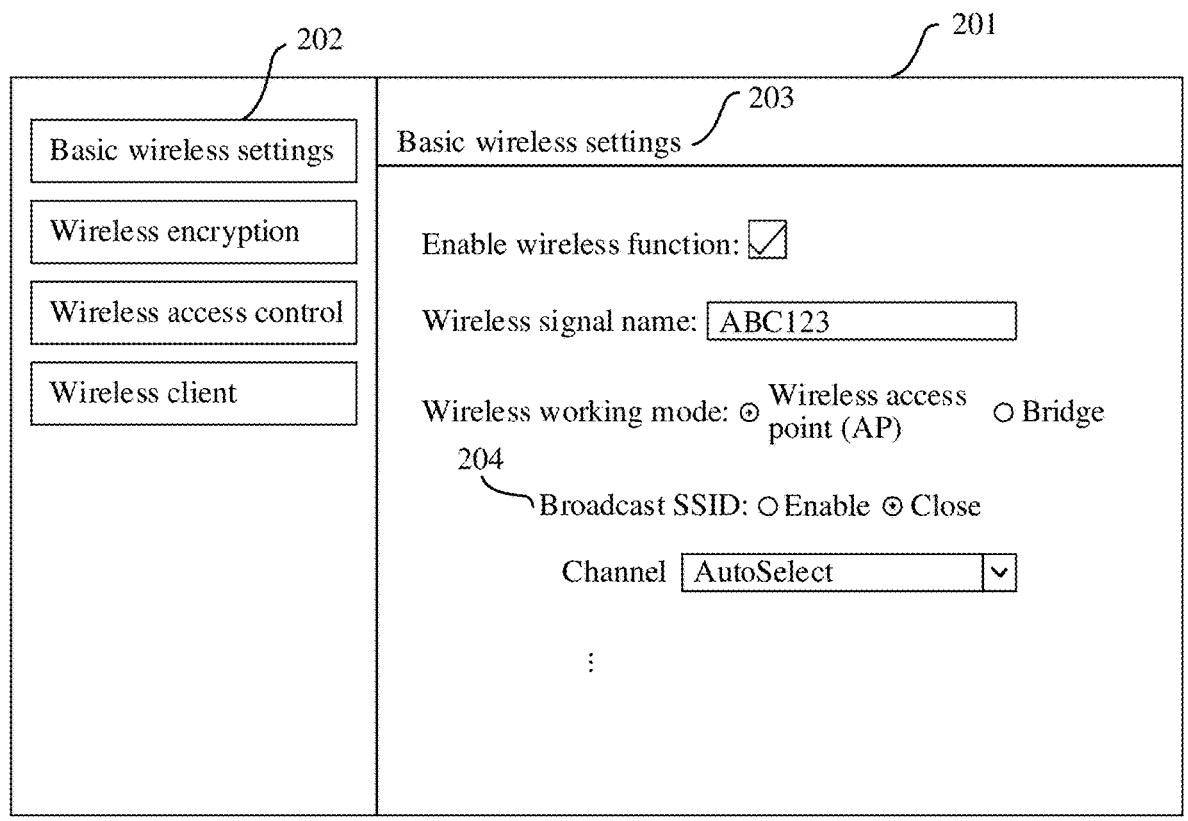
FIG. 2 is a schematic diagram of an example of a configuration screen on which a Wi-Fi hotspot is configured as a "hidden hotspot" in this application.

For example, it is assumed that the notebook computer 120 (namely, the Wi-Fi hotspot-2) shown in FIG. 1A and FIG. 1B is configured as a hidden hotspot. A user uses the notebook computer 120 to log in to a configuration screen 201 of a wireless router shown in FIG. 2, and configures the notebook computer 120 as the hidden hotspot. A screen 203 corresponding to a wireless setting option 202 on the configuration screen 201 shown in FIG. 2 includes a "broadcast an SSID signal of a wireless router" option 204. As shown in FIG. 2, when the user disables the "broadcast an SSID signal of a wireless router" option 204, the notebook computer 120 is configured as the hidden hotspot.

When the notebook computer 120 is configured as the hidden hotspot, the notebook computer 120 does not broadcast the Wi-Fi beacon frame carrying the SSID (ABC123) of the Wi-Fi hotspot-2. In this case, the terminal (for example, the mobile phone) cannot detect the SSID of the notebook computer 120. In other words, the terminal does not display the SSID of the notebook computer 120 on the "Wi-Fi setting" screen. For example, as shown in FIG. 1A, a "Wi-Fi setting" screen 101 of the mobile phone 100 includes only the SSID (Zhangsan) of the router 110, the SSID (Xyzd) of the mobile phone 130, and the SSID (G1B-1B-19-7R-2.4G) of the router 140, but does not include the SSID (ABC123) of the notebook computer 120.

If the user wants to control the mobile phone 100 to connect to a Wi-Fi network provided by the notebook computer 120, the user may tap an "add network" option 102 on the "Wi-Fi setting" screen 101 shown in FIG. 1A. Then, the mobile phone 100 may display a hotspot addition screen 103 shown in FIG. 1B. As shown in FIG. 1B, the hotspot addition screen 103 may include an SSID input box 104, a security selection box 105, a "cancel" button 106, and a "connect" button 107. The SSID input box 104 is used to input an SSID (such as ABC123) of a Wi-Fi hotspot. The security selection box 105 is used to select an encryption manner of the Wi-Fi hotspot. The "cancel" button 106 is used to cancel a connection to the Wi-Fi hotspot. The "connect" button 107 is used to instruct the terminal to connect to the Wi-Fi hotspot.

Figure 3:
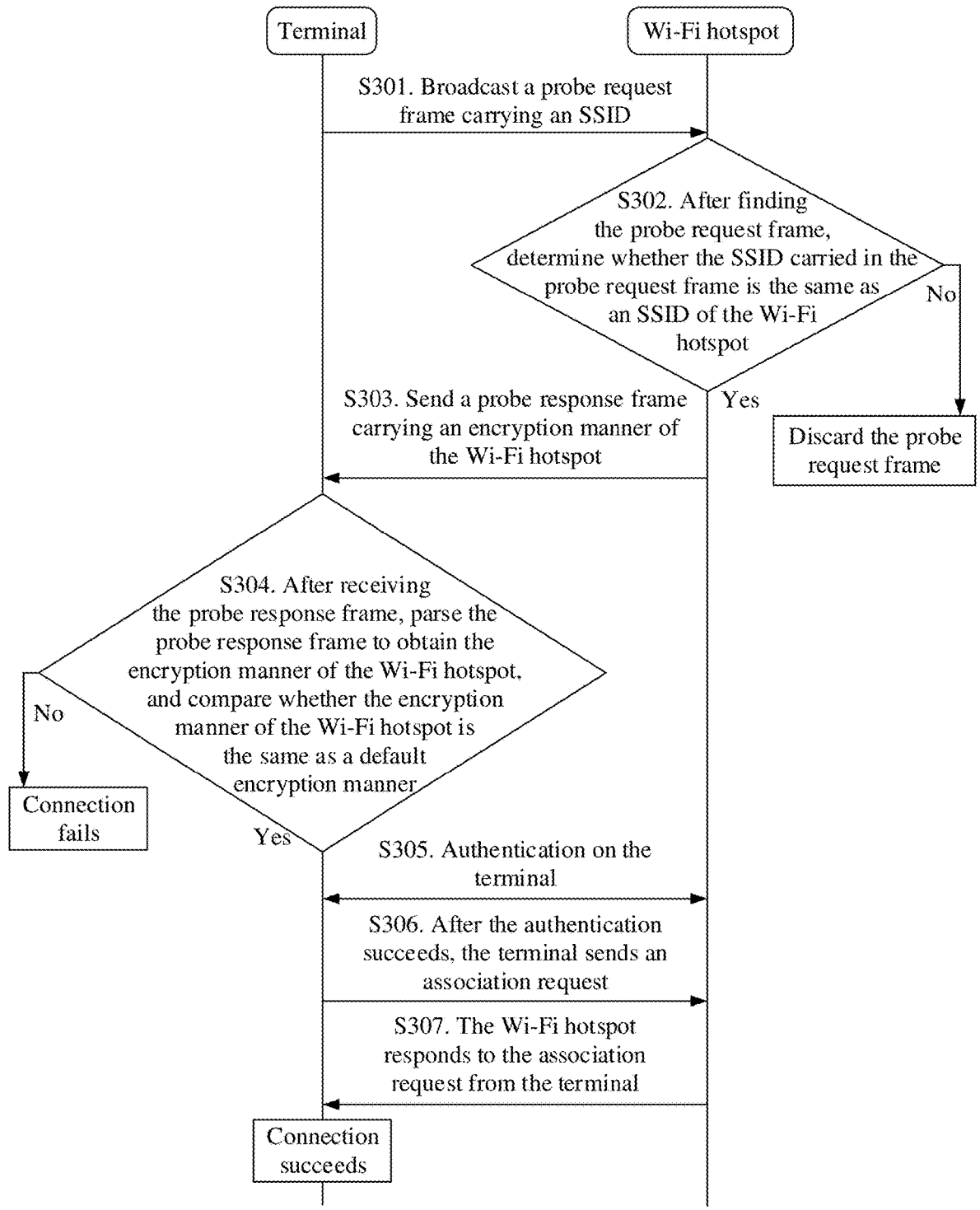
FIG. 3 is a flowchart 1 of a Wi-Fi hotspot connection method according to this application.

The following describes a method in which the terminal connects to the Wi-Fi hotspot in response to a tapping operation on the "connect" button 107 after the terminal receives the SSID input by the user in the SSID input box 104. Generally, as shown in FIG. 3, a method for a terminal to connect to a Wi-Fi hotspot includes operations S301 to S307.

S301. The terminal broadcasts a probe request frame carrying an SSID.

Assuming that an SSID of the Wi-Fi hotspot is "ABC123", the terminal broadcasts the following probe request frame:

Tag: SSID parameter set: ABC123
Tag Number: SSID parameter set (0)
Tag length: 6, indicating that a length of the SSID carried in the probe request frame is 6
SSID: ABC123, indicating that the SSID carried in the probe request frame is "ABC123".

It should be noted that this application merely uses an example to provide information, related to this application, in information carried in the probe request frame, such as the SSID (ABC123) and the length of the SSID. The probe request frame in this application includes but is not limited to the foregoing information. Other information carried in the probe request frame is not described in detail in this application.

S302. After finding the probe request frame, the Wi-Fi hotspot determines whether the SSID carried in the probe request frame is the same as the SSID of the Wi-Fi hotspot.

Specifically, if the SSID carried in the probe request frame is the same as the SSID of the Wi-Fi hotspot, operation S303 is performed. If the SSID carried in the probe request frame is different from the SSID of the Wi-Fi hotspot, the Wi-Fi hotspot discards the probe request frame.

S303. The Wi-Fi hotspot sends a probe response frame to the terminal, where the probe response frame carries an encryption manner of the Wi-Fi hotspot.

After receiving the probe request frame, the Wi-Fi hotspot parses the probe request frame to obtain the SSID; and if the obtained SSID is the same as the SSID of the Wi-Fi hotspot, determines that the terminal can connect to the Wi-Fi hotspot. The Wi-Fi hotspot may return the probe response frame to the terminal. The probe response frame carries the following robust security network information. To be specific, the following RSN information is the encryption manner of the Wi-Fi hotspot carried in the probe response frame:

Tag: SSID parameter Mil: ABC123
Tag Number: SSID parameter set (0)
Tag length: 6
SSID: ABC123
Tag: RSN Information
Group Cipher Suite: 00-0f-ac AES (CCM)
Pairwise Cipher Suite List 00-0f-ac AES (CCM)
Auth Key Management (AKM) type: PSK (2)

An AES is an advanced encryption standard encryption algorithm, and a counter mode (Counter ModeCBC MAC. CCM) is an authentication-based encryption technology in IEEE 802.1x. The AES (CCM) is corresponding to a WPA encryption manner. With reference to the foregoing "Auth Key Management (AKM) type", it can be learned that the encryption manner of the Wi-Fi hotspot is WPA PSK.

It should be noted that this application merely uses an example to provide information, related to this application, in information carried in the probe response frame, such as the encryption manner (WPA PSK). The probe response frame in this application includes but is not limited to the foregoing information. Other information carried in the probe response frame is not described in detail in this application.

S304. After receiving the probe response frame, the terminal parses the probe response frame to obtain the encryption manner of the Wi-Fi hotspot, and compares whether the encryption manner of the Wi-Fi hotspot is the same as a default encryption manner.

The encryption manner of the Wi-Fi hotspot may include a wired equivalent privacy (WEP) protocol manner, a Wi-Fi protected access (WPA)/WPA2 pre-shared key (PSK) manner, a wireless local area network authentication and privacy infrastructure (WAPI) PSK manner, a WAPI certificate manner, and the like.

Specifically, if the encryption manner carried in the probe response frame is the same as the encryption manner selected from the security selection box, operations S305 to S307 are performed. If the encryption manner carried in the probe response frame is different from the encryption manner selected from the security selection box, the terminal may display prompt information "connection fails".

S305. The terminal requests the Wi-Fi hotspot to authenticate the terminal.

A response made by the Wi-Fi hotspot to the authentication request may indicate whether the authentication on the terminal succeeds.

S306. After the authentication succeeds, the terminal sends an association request to the Wi-Fi hotspot.

S307. The Wi-Fi hotspot responds to the (Association) request from the terminal.

After operation S307 is performed, the terminal succeeds in connecting to the Wi-Fi hotspot. The authentication in this application includes authentication performed by the Wi-Fi hotspot on an access password sent by the terminal.

Figure 4A:
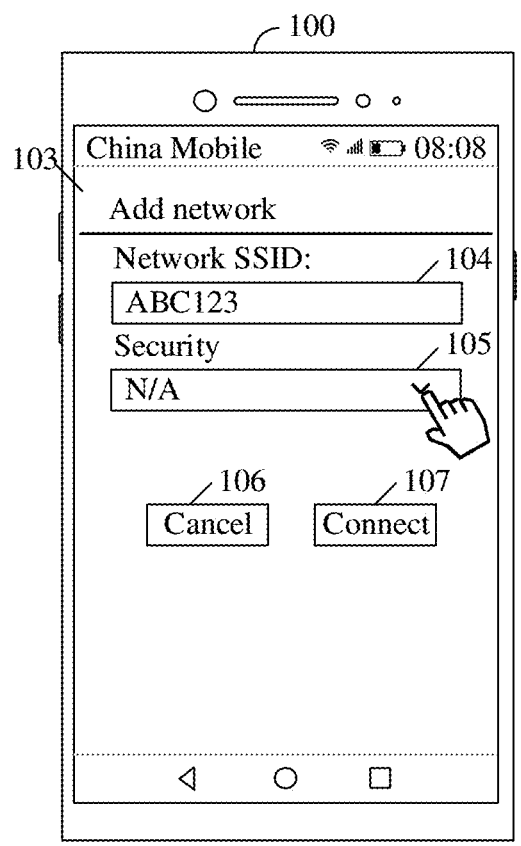
FIG. 4A to FIG. 4D are a schematic diagram 1 of a screen in a scenario of a Wi-Fi hotspot connection method according to this application.

In a scenario of this application, after the terminal receives an SSID input by a user in an SSID input box 104 shown in FIG. 4A, if the terminal does not receive a user's operation on a security selection box 105 for selecting an encryption manner of the Wi-Fi hotspot, but directly receives a user's tapping operation on a "connect" button 107, the terminal may consider by default that the Wi-Fi hotspot is unencrypted, in other words, the default encryption manner is N/A.

For an unencrypted Wi-Fi hotspot, the encryption manner carried in the probe response frame sent by the Wi-Fi hotspot is N/A. In addition, even if the user does not select the encryption manner of the Wi-Fi hotspot from the security selection box 105, but directly taps the "connect" button 107, because the encryption manner selected from the security selection box is the default encryption manner (that is, the encryption manner is N/A), the encryption manner carried in the probe response frame is the same as the encryption manner selected from the security selection box. In this case, the terminal may perform operations S305 to S307, and succeeds in connecting to the Wi-Fi hotspot.

However, for an encrypted Wi-Fi hotspot, after the user inputs the SSID of the Wi-Fi hotspot in the SSID input box 104, the user further needs to input a correct encryption manner and access password of the Wi-Fi hotspot in the security selection box 105, and then can succeed in connecting to the Wi-Fi hotspot.

However, most users are unfamiliar with a hidden hotspot connection manner. After inputting the SSID of the hidden hotspot in the SSID input box 104, the users may directly tap the "connect" button 107, to connect to the hidden hotspot. A result is definitely a connection failure. Specifically, the encryption manner (for example, the WPA/WPA2 PSK manner) of the encrypted Wi-Fi hotspot is different from the default encryption manner "N/A" of the terminal. As a result, the terminal fails to connect to the Wi-Fi hotspot.

Certainly, some users may be familiar with the hidden hotspot connection manner. However, to connecting to the hidden hotspot successfully, the user not only needs to know the SSID and the access password of the hidden hotspot, but also needs to know the encryption manner of the hidden hotspot. However, a user may usually remember the SSID and the access password of the Wi-Fi hotspot, but is unaware of the encryption manner of the Wi-Fi hotspot.

Figure 4B:
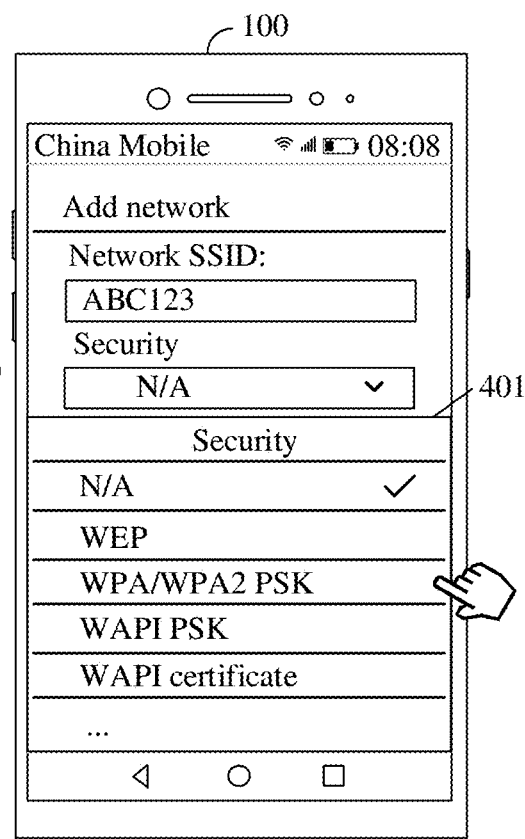

In another scenario of this application, as shown in FIG. 4A to FIG. 4D, after the terminal receives an SSID input by a user in an SSID input box 104, if the terminal receives a user's tapping operation on a security selection box 105 shown in FIG. 4A, the terminal may display a "security" list 401 shown in FIG. 4B. The "security" list 401 includes a possible encryption manner of the Wi-Fi hotspot, for example, a WEP manner, a WPA/WPA2 PSK manner, a WAPI PSK manner, or a WAPI certificate manner.

Figure 4D:
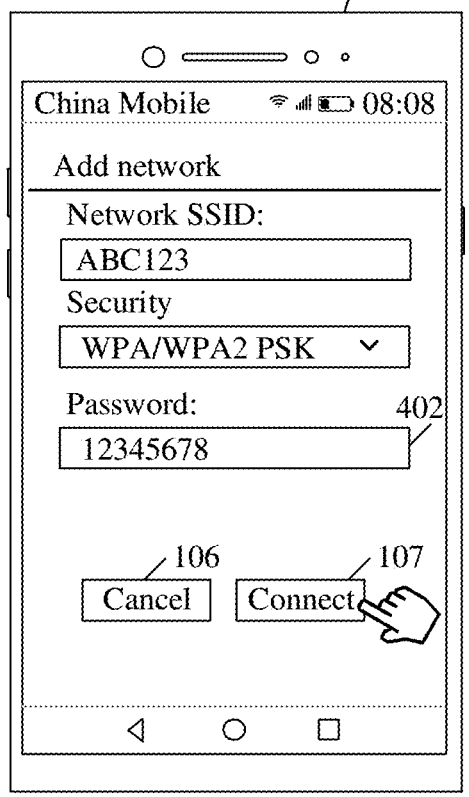
Figure 4C:
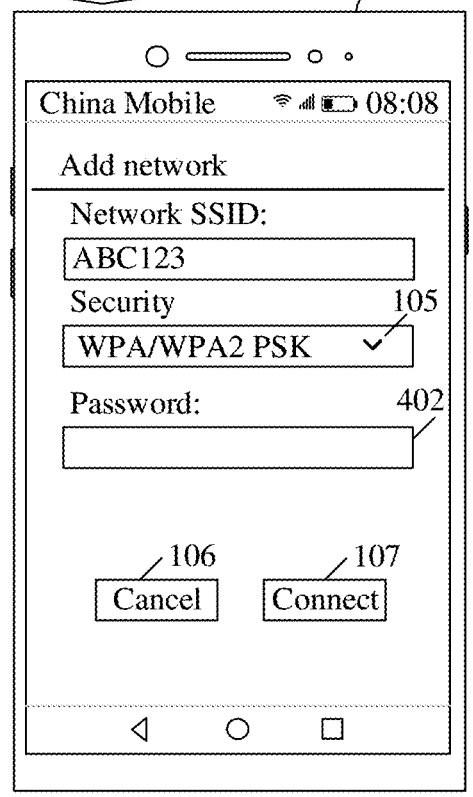

As shown in FIG. 4B, after the user selects the WPA/WPA2 PSK manner from the "security" list 401, the mobile phone 100 may display a display screen shown in FIG. 4C. The display screen shown in FIG. 4C includes a "password" input window 402. The "password" input window 402 is used to input an access password of the Wi-Fi hotspot, and an encryption manner selected by the user, for example, the WPA/WPA2 PSK manner, is displayed in the security selection box 105. In this scenario, the encryption manner selected from the security selection box is the encryption manner selected by the user, for example, the WPA/WPA2 PSK manner.

As shown in FIG. 4D, after the user inputs the SSID "ABC123" and the access password "12345678" in the "password" input window 402, if the user taps a "connect" button 107, the mobile phone 100 may send a probe request frame to the Wi-Fi hotspot. After receiving the probe response frame, the mobile phone 100 may compare the encryption manner carried in the probe response frame with the encryption manner "WPA/WPA2 PSK" manner selected by the user. If the encryption manner carried in the probe response frame is the same as the WPA/WPA2 PSK manner, the mobile phone 100 performs operations S305 to S307, and succeeds in connecting to the Wi-Fi hotspot. If the encryption manner carried in the probe response frame is the same as the WPA/WPA2 PSK manner, the mobile phone 100 fails to connect to the Wi-Fi hotspot.

If the user does not know the encryption manner of the Wi-Fi hotspot, the user needs to attempt to successively use the encryption manners in the "security" list 401 shown in FIG. 4B, to connect to the Wi-Fi hotspot. When the user attempts to successively use the encryption manner in the "security" list (for example, the "security" list 401) to connect to the Wi-Fi hotspot, user operations are complex, and user's experience is affected.

It should be emphasized again that the Wi-Fi hotspot connection method provided in this application may be applied to not only a process in which the terminal connects to a Wi-Fi hotspot in a hidden state, but also a process in which the terminal connects to a common Wi-Fi hotspot (that is, a Wi-Fi hotspot that is not configured as a hidden hotspot). For example, some users may want to control the mobile phone 100 to connect, by using a hotspot addition screen 103 shown in FIG. 4A, to the Wi-Fi hotspot that is not configured as the hidden hotspot. However, if the Wi-Fi hotspot is an encrypted hotspot, even though the user knows an access password, the user may not know an encryption manner of the Wi-Fi hotspot. In this case, the user needs to attempt to successively use encryption manners in a "security" list to attempt to connect to the Wi-Fi hotspot, until the user succeeds in connecting to the Wi-Fi hotspot. Consequently, operations performed by the user are complex, and user experience is affected.

According to the Wi-Fi hotspot connection method provided in this application, the terminal may automatically obtain the encryption manner of the Wi-Fi hotspot (including the hidden hotspot and the common Wi-Fi hotspot). This can reduce operations performed by the user when the terminal connects to the Wi-Fi hotspot, shorten a time for the terminal to connect to the Wi-Fi hotspot, and improve user experience.

Figure 5:
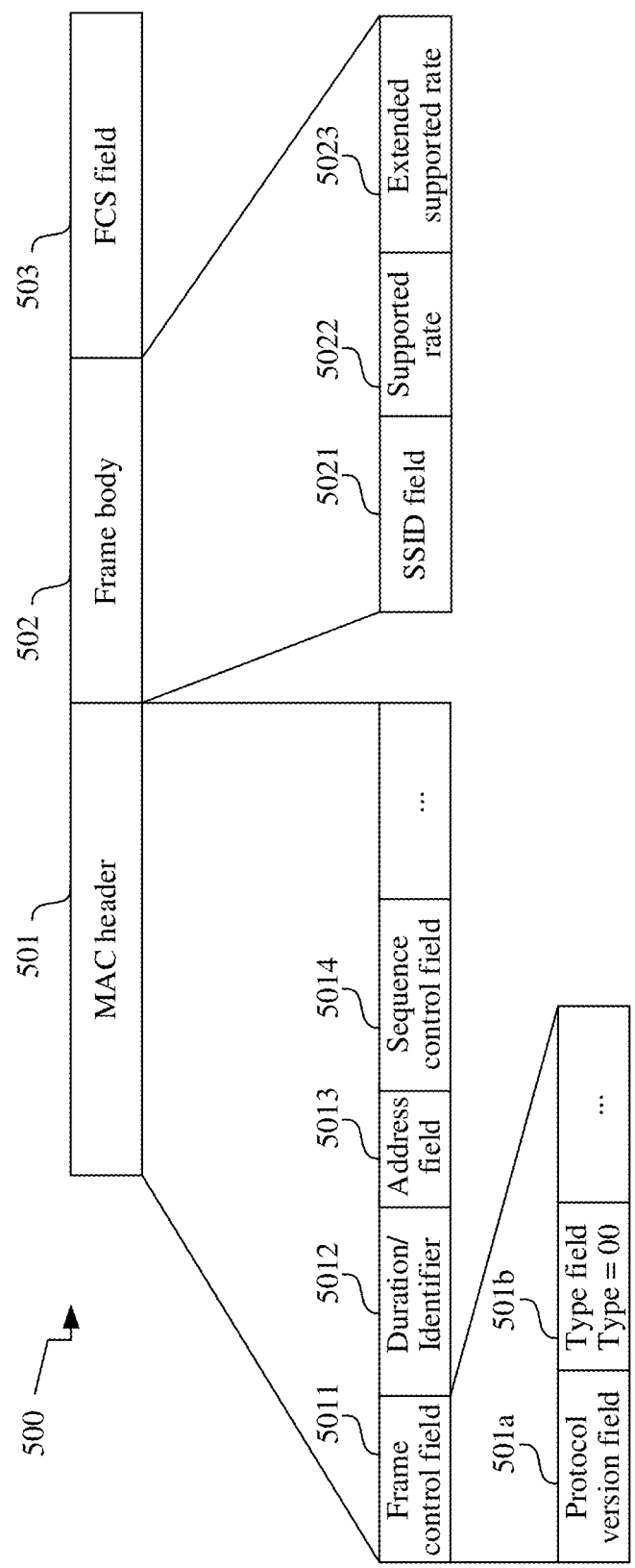
FIG. 5 is a schematic diagram of a frame structure of a Wi-Fi frame according to this application.

FIG. 5 is a schematic diagram of an example of a frame structure of a Wi-Fi frame according to this application. As shown in FIG. 5, the Wi-Fi frame 500 may include a frame header (namely, a MAC header) 501, a frame body 502, and a frame check sequence (FCS) field 503. The MAC header 501 is the media access control (MAC) header.

As shown in FIG. 5, the MAC header 501 may include a frame control field 5011, a duration/identifier (Duration/ID) 5012, an address (Address) field 5013, a sequence control field 5014, and the like.

The frame control field 5011 may include a protocol version field $501a$, a type field $501b$, and the like. The protocol version field $501a$ is used to indicate a protocol version to which the Wi-Fi frame 500 conforms, where the protocol version is usually 0. The type field $501b$ may include a type and a subtype, where the type is used to indicate that a corresponding frame is a management frame, a data frame, or a control frame, and the subtype is used to indicate a subtype of the frame. For example, when type=00, it may indicate that the corresponding frame is the management frame. In this case, the subtype may indicate that the management frame is a type of management frame, such as a beacon frame, a probe request frame, or a probe response frame. For example, when type=00 and subtype=0100, the Wi-Fi frame 500 shown in FIG. 5 is the probe request frame. When type=00 and subtype=0101, the Wi-Fi frame 500 shown in FIG. 5 is the probe response frame. The address field 5013 may include address information such as a source address, a destination address, a transmission workstation address, and a receiving workstation address, where the destination address may be any one of a unicast address, a multicast address, and a broadcast address.

As shown in FIG. 5, the frame body 502 includes an SSID field 5021, a supported rate 5050, and an extended supported rate 5023. The supported rate 5022 and the extended supported rate 5023 are used to indicate a set of rates supported by a mobile phone or a wireless router.

The probe request frame may be a management frame in IEEE 802.11. A station (STA) (for example, the mobile phone 100) may detect a Wi-Fi signal in a manner of proactively sending a probe request frame carrying an SSID. When the Wi-Fi frame 500 shown in FIG. 5 is the probe request frame, to be specific, when the type and the subtype in the type field $501b$ indicate that the Wi-Fi frame 500 is the probe request frame, the SSID field 5021 in the Wi-Fi frame 500 carries an SSID of a Wi-Fi hotspot. When the Wi-Fi frame 500 shown in FIG. 5 is the probe request frame, to be specific, when the type and the subtype in the type field $501b$ indicate that the Wi-Fi frame 500 is the probe request frame, the frame body 502 not only includes the SSID of the Wi-Fi hotspot, but also includes an encryption manner of the Wi-Fi hotspot.

Figure 6:
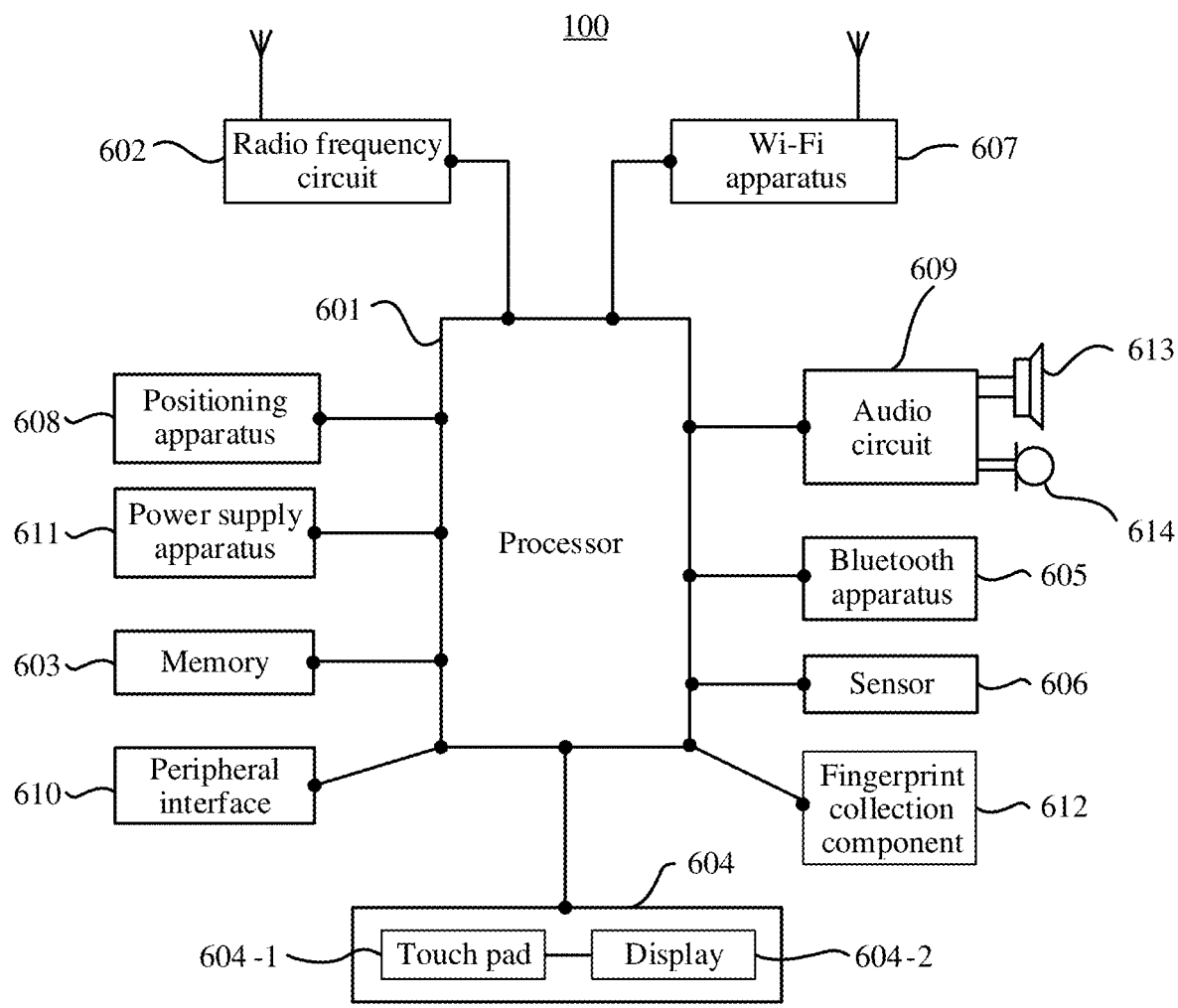
FIG. 6 is a schematic diagram of a hardware structure of a mobile phone according to this application.

As shown in FIG. 6, for example, a mobile phone 100 is used as the terminal, and the mobile phone 100 may specifically include components such as a processor 601, a radio frequency (RF) circuit 602, a memory 603, a touchscreen 604, a Bluetooth apparatus 605, one or more sensors 606, a Wi-Fi apparatus 607, a positioning apparatus 608, an audio circuit 609, a peripheral interface 610, and a power system 611. These components may perform communication by using one or more communications buses or signal cables (not shown in FIG. 6). Persons skilled in the art may understand that a hardware structure shown in FIG. 6 does not constitute a limitation on the mobile phone, and the mobile phone 100 may include more or fewer components than those shown in the figure, or may combine some components, or have different component arrangements.

The following describes the components of the mobile phone 100 in detail with reference to FIG. 6.

The processor 601 is a control center of the mobile phone 100, is connected to components of the mobile phone 100 by using various interfaces and lines, and performs various functions of the mobile phone 100 and data processing by running or executing an application program stored in the memory 603 and invoking data stored in the memory 603. In some embodiments, the processor 601 may include one or more processing units. In some embodiments of this application, the processor 601 may further include a fingerprint verification chip, configured to verify a captured fingerprint.

The radio frequency circuit 602 may be configured to receive and send radio signals. Particularly, after receiving downlink data from a base station, the radio frequency circuit 602 may send the downlink data to the processor 601 for processing, and send related uplink data to the base station. The radio frequency circuit usually includes but is not limited to an antenna, at least one amplifier, a transceiver, a coupler, a low noise amplifier, a duplexer, and the like. In addition, the radio frequency circuit 602 may further communicate with another device through wireless communication. The wireless communication may use any communications standard or protocol, including but not limited to a global system for mobile communications, a general packet radio service, code division multiple access, wideband code division multiple access, long term evolution, or the like.

The memory 603 is configured to store the application program and the data. The processor 601 performs various functions of the mobile phone 100 and data processing by running the application program and the data stored in the memory 603. The memory 603 mainly includes a program storage area and a data storage area. The program storage area may store an operating system, and an application program required by at least one function (such as a voice playing function or an image playing function). The data storage area may store data (such as audio data and a phone book) that is created based on use of the mobile phone 100. In addition, the memory 603 may include a high-speed random access memory (RAM), and may further include a non-volatile memory such as a magnetic disk storage component, a flash memory component, or another volatile solid-state storage component. The memory 603 may store various operating systems. The memory 603 may be independent, and is connected to the processor 601 by using the communications bus; or the memory 603 may be integrated with the processor 601.

The touchscreen 604 may specifically include a touchpad 604-1 and a display 604-2.

The touchpad 604-1 may collect a touch event performed by a user on or near the mobile phone 100 (for example, an operation performed by the user on or near the touchpad 604-1 by using any proper object such as a finger or a stylus), and send collected touch information to another device (for example, the processor 601). The touch event performed by the user near the touchpad 604-1 may be referred to as a floating touch. The floating touch may be that the user does not need to directly touch the touchpad for selecting, moving, or dragging an object (for example, an icon), and that the user only needs to be located near the device for ease of performing a desired function. In addition, the touchpad 604-1 may be implemented in a plurality of types such as a resistive type, a capacitive type, an infrared type, and a surface acoustic wave type.

The display (also referred to as a display screen) 604-2 may be configured to display information entered by the user or information provided for the user, and various menus of the mobile phone 100. The display 604-2 may be configured in a form such as a liquid crystal display or an organic light-emitting diode. The touchpad 604-1 may cover the display 604-2. When detecting a touch event on or near the touchpad 604-1, the touchpad 604-1 transfers the touch event to the processor 601 to determine a type of the touch event. Then, the processor 601 may provide corresponding visual output on the display 104-2 based on the type of the touch event. In FIG. 6, the touchpad 604-1 and the display screen 604-2 are used as two independent components to implement input and output functions of the mobile phone 100. However, in some embodiments, the touchpad 604-1 and the display screen 604-2 may be integrated to implement the input and output functions of the mobile phone 100. It may be understood that the touchscreen 604 is made by stacking a plurality of layers of materials. In this embodiment of this application, only the touchpad (layer) and the display screen (layer) are displayed, and other layers are not described in this embodiment of this application. In addition, the touchpad 604-1 may be configured on the front side of the mobile phone 100 in a full panel form, and the display screen 604-2 may also be configured on the front side of the mobile phone 100 in a full panel form, so that a bezel-less structure can be implemented for the front side of the mobile phone.

In addition, the mobile phone 100 may further have a fingerprint recognition function. For example, a fingerprint recognizer 612 may be configured on the back side (for example, below a rear-facing camera) of the mobile phone 100, or the fingerprint recognizer 612 is configured on the front side (for example, below the touchscreen 604) of the mobile phone 100. For another example, the fingerprint recognizer 612 may be configured on the touchscreen 604 to implement the fingerprint recognition function. To be specific, the fingerprint recognizer 612 may be integrated with the touchscreen 604 to implement the fingerprint recognition function of the mobile phone 100. In this case, the fingerprint recognizer 612 is configured on the touchscreen 604, and may be a part of the touchscreen 604, or may be configured on the touchscreen 604 in another manner. A main component of the fingerprint recognizer 612 in this embodiment of this application is a fingerprint sensor. The fingerprint sensor may use any type of sensing technology, including but not limited to an optical, capacitive, piezoelectric, or ultrasonic sensing technology, or the like.

The mobile phone 100 may further include the Bluetooth apparatus 605, configured to implement data exchange between the mobile phone 100 and another device within a short range (for example, a mobile phone or a smartwatch).

In this embodiment of this application, the Bluetooth apparatus may be an integrated circuit, a Bluetooth chip, or the like.

The mobile phone 100 may further include at least one type of sensor 606, such as a light sensor, a motion sensor, and another sensor. Specifically, the light sensor may include an ambient light sensor and a proximity sensor. The ambient light sensor may adjust luminance of the display on the touchscreen 604 based on brightness of ambience light. The proximity sensor may turn off the display when the mobile phone 100 approaches an ear. As a type of the motion sensor, an accelerometer sensor may detect acceleration values in directions (usually three axes), may detect, in a static state, a value and a direction of gravity, and may be used for an application for identifying a posture (such as screen switching between a landscape mode and a portrait mode, a related game, and magnetometer posture calibration) of the mobile phone, a vibration-identification-related function (such as a pedometer and tapping), and the like. Other sensors that can be configured on the mobile phone 10 such as a gyroscope, a barometer, a hygrometer, a thermometer, and an infrared sensor are not described herein.

The Wi-Fi apparatus 607 is configured to provide the mobile phone 100 with network access that complies with a Wi-Fi-related standard protocol, and the mobile phone 100 may access a Wi-Fi hotspot by using the Wi-Fi apparatus 607, to help the user receive and send an email, browse a web page, access streaming media, and the like. The Wi-Fi apparatus 607 provides wireless broadband internet access for the user. In some other embodiments, the Wi-Fi apparatus 607 may also be used as a Wi-Fi wireless access point, and may provide Wi-Fi network access for another device.

The positioning apparatus 608 is configured to provide a geographic location for the mobile phone 100. It may be understood that the positioning apparatus 608 may be specifically a receiver of a positioning system such as a global positioning system (GPS), the BeiDou navigation satellite system, or the Russian GLONASS. After receiving the geographic location sent by the positioning system, the positioning apparatus 608 sends the information to the processor 601 for processing, or sends the information to the memory 603 for storage. In some other embodiments, the positioning apparatus 608 may also be a receiver of an assisted global positioning system (AGPS). The AGPS system, as an assisted server, assists the positioning apparatus 608 in completing ranging and positioning services. In this case, the assisted positioning server, by using a wireless communications network, communicates with a positioning apparatus 608 (namely, a GPS receiver) of a device such as the mobile phone 100 to provide positioning assistance. In some other embodiments, the positioning apparatus 608 may be alternatively an apparatus using a Wi-Fi hotspot-based positioning technology. Each Wi-Fi hotspot has a globally unique media access control (MAC) address. When Wi-Fi is enabled for the device, the device may scan and collect broadcast signals of nearby Wi-Fi hotspots, and therefore can obtain the MAC addresses broadcast by the Wi-Fi hotspots. The device sends, to a location server by using a wireless communications network, data (for example, the MAC addresses) that can identify the Wi-Fi hotspots. The location server retrieves a geographic location of each Wi-Fi hotspot, calculates a geographic location of the device based on strength of the Wi-Fi broadcast signals, and sends the geographic location to the positioning apparatus 608 of the device.

The audio circuit 609, a speaker 613, and a microphone 614 may provide an audio interface between the user and the mobile phone 100. The audio circuit 609 may transmit an electrical signal obtained by converting received audio data, to the speaker 613, and the speaker 613 converts the electrical signal into a sound signal for output. In addition, the microphone 614 converts a collected sound signal into an electrical signal. The audio circuit 609 receives the electrical signal, converts the electrical signal into audio data, and then outputs the audio data to the RF circuit 602, so as to send the audio data to, for example, another mobile phone, or outputs the audio data to the memory 603 for further processing.

The peripheral interface 610 is configured to provide various interfaces for an external input/output device (for example, a keyboard, a mouse, an external display, an external memory, and a subscriber identity module card). For example, the peripheral interface 610 is connected to a mouse by using a universal serial bus (USB) interface, and connected, by using a metal contact in a subscriber identity module card slot, to a subscriber identity module (SIM) card provided by a telecommunications operator. The peripheral interface 610 may be configured to couple the external input/output peripheral device to the processor 601 and the memory 603.

In this embodiment of the present invention, the mobile phone 100 may communicate with another device in a device group through the peripheral interface 610, for example, may receive, through the peripheral interface 610, displayed data sent by the another device for displaying. This is not limited in this embodiment of the present invention.

The mobile phone 100 may further include the power supply apparatus 611 (for example, a battery and a power supply management chip) that supplies power to the components. The battery may be logically connected to the processor 601 by using the power supply management chip, so that functions such as charging, discharging, and power consumption management are implemented by using the power supply apparatus 611.

Although not shown in FIG. 6, the mobile phone 100 may further include a camera (a front-facing camera and/or a rear-facing camera), a flash, a micro projection apparatus, a near field communication (NFC) apparatus, and the like. Details are not described herein again.

All methods in the following embodiments may be implemented in the mobile phone 100 having the foregoing hardware structure.

Figure 7:
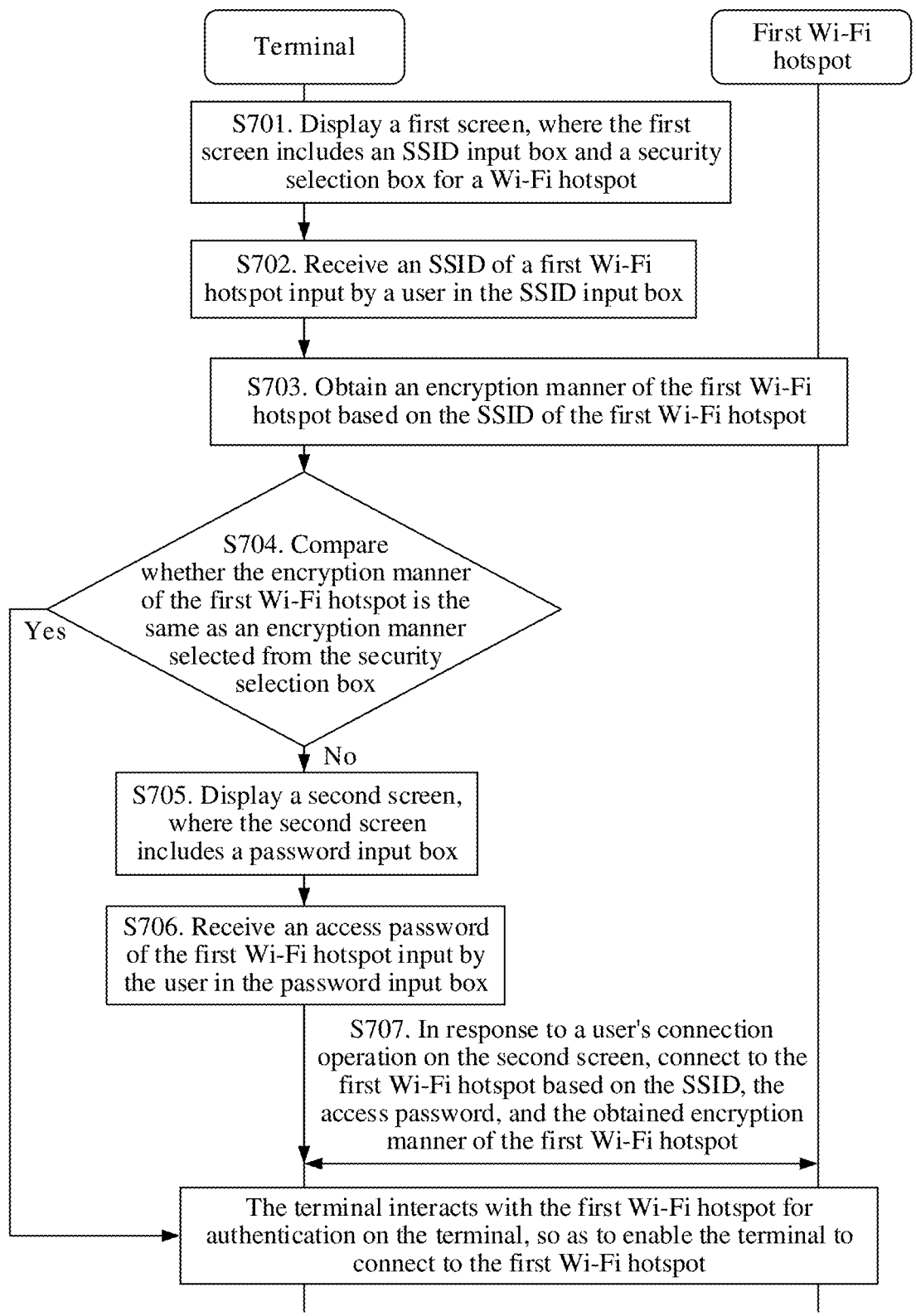
FIG. 7 is a flowchart 2 of a Wi-Fi hotspot connection method according to this application.

This application provides a Wi-Fi hotspot connection method, and the method may be applied to a process in which a terminal connects to a Wi-Fi hotspot. As shown in FIG. 7, the Wi-Fi hotspot connection method provided in this application includes operations S701 to S707.

S701. The terminal displays a first screen, where the first screen includes an SSID input box and a security selection box for a Wi-Fi hotspot.

Figure 8A:
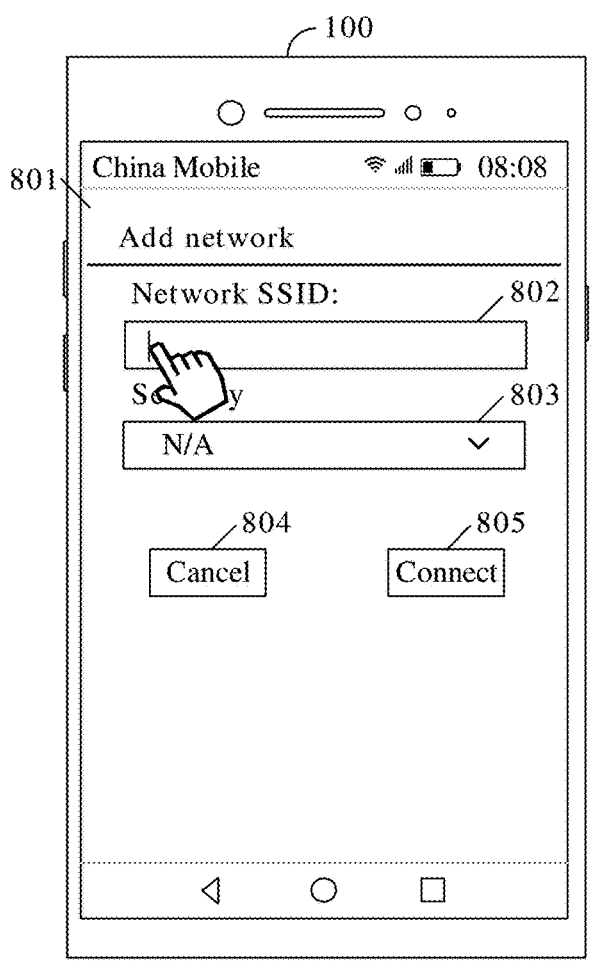
FIG. 8A and FIG. 8B are a schematic diagram 2 of a screen in a scenario of a Wi-Fi hotspot connection method according to this application.

For example, the terminal is a mobile phone 100. The first screen in this application may be a hotspot addition screen 801 shown in FIG. 8A. The hotspot addition screen 801 (namely, the first screen) may include an SSID input box 802, a security selection box 803, a "cancel" button 804, and a "connect" button 805. For detailed descriptions of the SSID input box 802, the security selection box 803, the "cancel" button 804, and the "connect" button 805, refer to descriptions of the SSID input box 104, the security selection box 105, the "cancel" button 106, and the "connect" button 107 that are shown in FIG. 1B in this application. Details are not described herein in this application again.

S702. The terminal receives an SSID of a first Wi-Fi hotspot input by a user in the SSID input box.

Figure 8B:
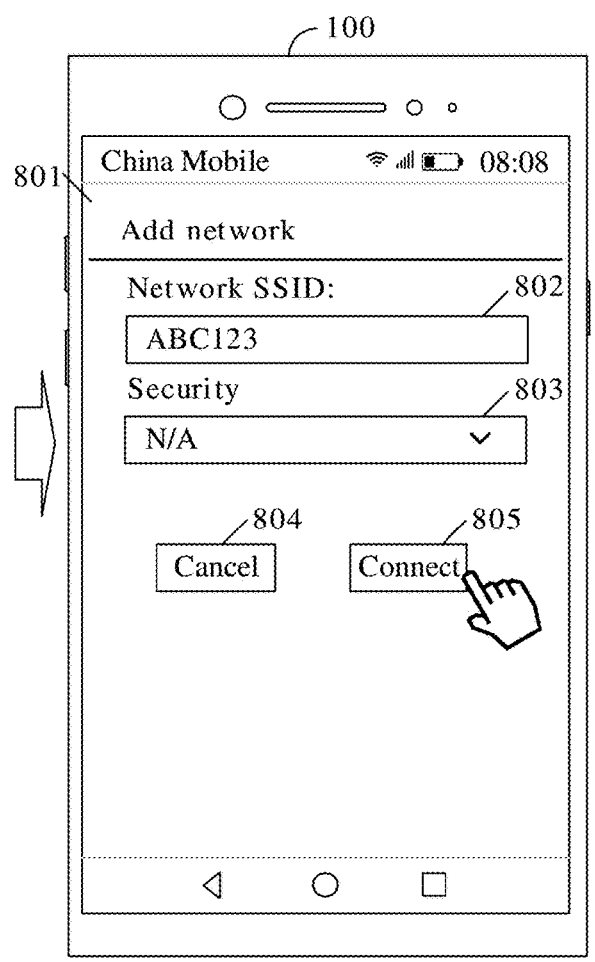

For example, the mobile phone 100 may receive an SSID input by the user in the SSID input box 802, for example, ABC123. In this case, as shown in FIG. 8B, the SSID input box 802 may include the SSID input by the user, for example, ABC123.

S703. The terminal obtains an encryption manner of the first Wi-Fi hotspot based on the SSID of the first Wi-Fi hotspot.

In a first application scenario of this application, as shown in operation S703 in FIG. 7, the terminal may obtain the encryption manner of the first Wi-Fi hotspot from the first Wi-Fi hotspot based on the SSID of the first Wi-Fi hotspot. For a specific method in which the terminal obtains the encryption manner of the first Wi-Fi hotspot from the Wi-Fi hotspot, refer to detailed descriptions in operations S301 to S303 in this application. Details are not described herein again in this application.

In a second application scenario of this application, the terminal may obtain the encryption manner of the first Wi-Fi hotspot from a cloud server. A plurality of Wi-Fi hotspots may share encryption manners of the plurality of Wi-Fi hotspots with the cloud server, and the cloud server may store SSIDs and the encryption manners of the plurality of Wi-Fi hotspots. For example, the terminal may send an encryption manner obtaining request to the cloud server, where the encryption manner obtaining request carries the SSID of the first Wi-Fi hotspot. After receiving the encryption manner obtaining request, the cloud server searches for the encryption manner of the first Wi-Fi hotspot, and sends an encryption manner obtaining response to the terminal, where the encryption manner obtaining response carries the found encryption manner.

S704. The terminal compares whether the encryption manner of the first Wi-Fi hotspot is the same as an encryption manner selected from the security selection box.

Specifically, when the encryption manner of the first Wi-Fi hotspot is different from the encryption manner selected from the security selection box, operation S705 is performed. For example, when the encryption manner selected from the security selection box is a default encryption manner (that is, the encryption manner is N/A), and the encryption manner of the first Wi-Fi hotspot is WPA/WPA2 PSK, the terminal may perform operation S705. When the encryption manner of the first Wi-Fi hotspot is the same as the encryption manner selected from the security selection box, the terminal may interact with the first Wi-Fi hotspot for authentication on the terminal, so as to enable the terminal to connect to the first Wi-Fi hotspot. For a specific method in which the terminal interacts with the first Wi-Fi hotspot for authentication on the terminal, so as to enable the terminal to connect to the first Wi-Fi hotspot, refer to detailed descriptions of operations S305 to S307 in the foregoing embodiment. Details are not described herein again in this application.

S705. The terminal displays a second screen, where the second screen includes a password input box.

Both the second screen and the first screen in this application are screens used to add a Wi-Fi hotspot for the terminal. However, the second screen is different from the first screen. The second screen includes the "password" input window used to input an access password of the Wi-Fi hotspot.

For example, the terminal is the mobile phone 100. When the mobile phone 100 determines that the encryption manner of the first Wi-Fi hotspot is different from the default encryption manner, the mobile phone 100 may display a second screen 901 shown in FIG. 9 A. The second screen 901 includes a "password" input window 902, and the "password" input window 902 is used to receive an access password input by the user.

It may be understood that when the terminal displays the second screen, the terminal has obtained the encryption manner of the first Wi-Fi hotspot. In this case, the terminal may display the encryption manner of the first Wi-Fi hotspot on the second screen. For example, assuming that the encryption manner of the first Wi-Fi hotspot is WPA/WPA2 PSK, the mobile phone 100 may display a second screen 1001 shown in FIG. 10A. The second screen 1001 not only includes a "password" input window 902, but also includes a "security" selection box 1002 in which the encryption manner "WPA/WPA2 PSK" is displayed.

In this application, the terminal may further display the obtained encryption manner on the second screen, so that the user can know which encryption manner is used by the first Wi-Fi hotspot for encryption, that is, which encryption manner is a correct encryption manner used by the first Wi-Fi hotspot. In this way, the user can select the correct encryption manner when controlling another terminal to connect to the first Wi-Fi hotspot.

Figure 9:
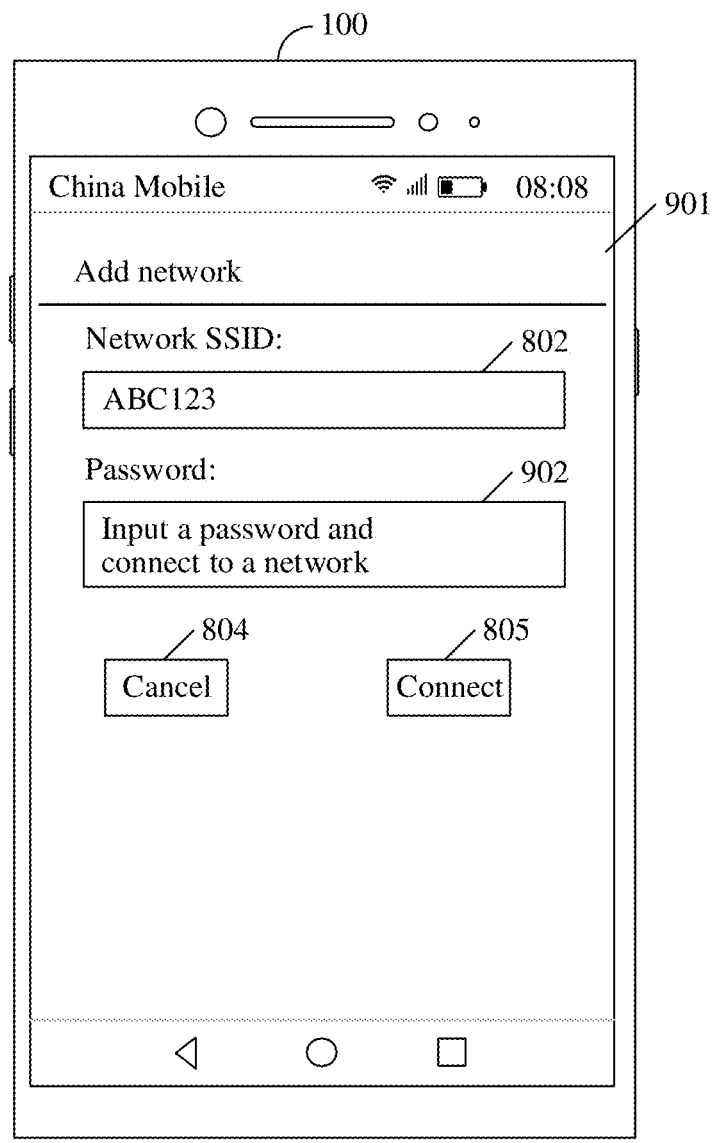
FIG. 9 is a schematic diagram 3 of a screen in a scenario of a Wi-Fi hotspot connection method according to this application.

It should be emphasized that, as shown in FIG. 9, that the terminal displays no "security" selection box 1002 does not mean that the terminal does not obtain the encryption manner of the first Wi-Fi hotspot. Instead, the terminal does not present the encryption manner to the user on the display screen of the terminal, and the terminal still connects to the first Wi-Fi hotspot based on the SSID of the first Wi-Fi hotspot, the encryption manner obtained by the terminal, and the access password of the first Wi-Fi hotspot. To be specific, in this application, the terminal may connect to the Wi-Fi hotspot in a manner in which the encryption manner of the Wi-Fi hotspot is imperceptible to the user.

S706. The terminal receives the access password of the first Wi-Fi hotspot input by the user in the password input box.

Figure 10A:
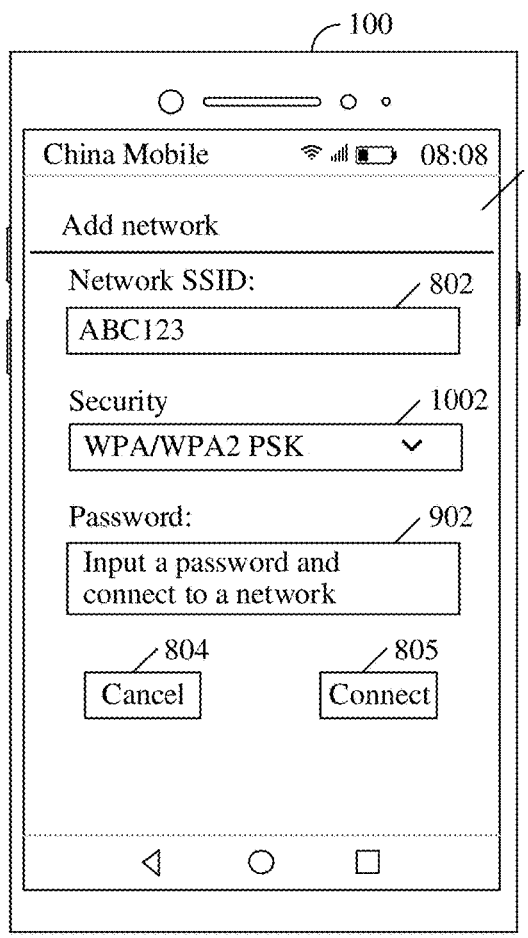
FIG. 10A and FIG. 10B are a schematic diagram 4 of a screen in a scenario of a Wi-Fi hotspot connection method according to this application.
Figure 10B:
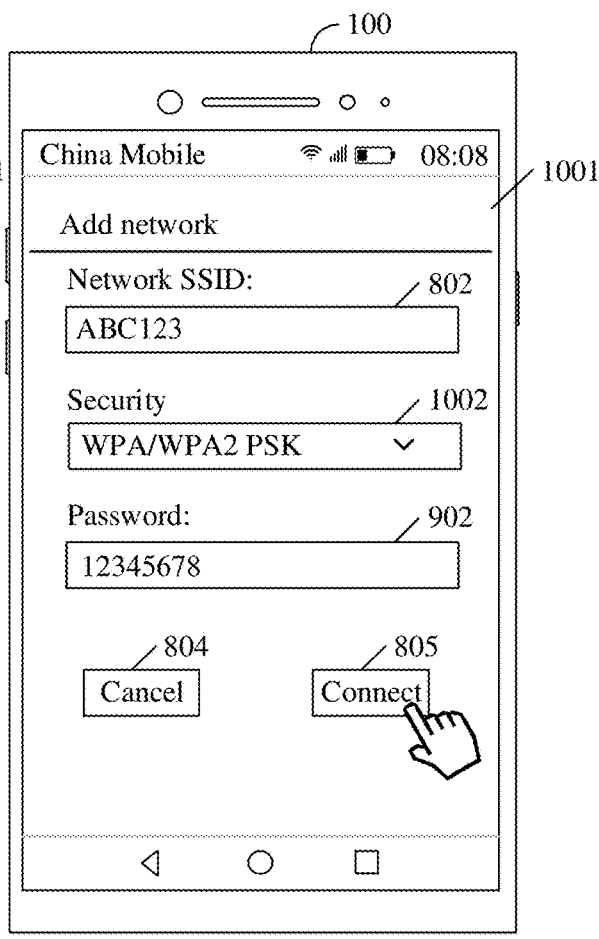

The second screen 1001 shown in FIG. 10A is used as an example. As shown in FIG. 10B, the mobile phone 100 may receive the access password input by the user in the "password" input window 902.

S707. In response to a user's connection operation on the second screen, the terminal connects to the first Wi-Fi hotspot based on the SSID, the access password, and the obtained encryption manner of the first Wi-Fi hotspot.

For example, the user's connection operation on the second screen may be a user's tapping operation on a "connect" button 805 on the second screen 1001 shown in FIG. 10B. As shown in FIG. 10B, after the user taps the "connect" button 805, in response to the user's tapping operation on the "connect" button 805, the mobile phone 100 may connect to the first Wi-Fi hotspot based on the SSID "ABC123" input in an SSID input box 802, the encryption manner "WPA/WPA2 PSK" displayed in a "security" selection box 1102, and the access password "12345678" input in a "password" input window 902.

It should be noted that, in this application, for a method in which the terminal connects to the first Wi-Fi hotspot based on the SSID, the access password, and the encryption manner of the first Wi-Fi hotspot, refer to the method operations corresponding to operations S301 to S307 in this application. Details are not described herein again in this application.

In one embodiment, before operation S707 is performed, the terminal has obtained the encryption manner of the first Wi-Fi hotspot, and determines that the obtained encryption manner is different from the encryption manner selected from the security selection box. In other words, the terminal has scanned the Wi-Fi hotspot. Therefore, the terminal may no longer broadcast the probe request frame to scan the Wi-Fi hotspot. To be specific, in this application, for a method in which the terminal connects to the first Wi-Fi hotspot based on the SSID, the access password, and the encryption manner of the first Wi-Fi hotspot, refer to the method operations corresponding to operations S305 to S307 in this application. Details are not described herein again in this application.

According to the Wi-Fi hotspot connection method in this application, when the encryption manner of the first Wi-Fi hotspot is different from the encryption manner selected from the security selection box, the terminal does not directly display information indicating a connection failure, but displays the second screen on which the access password can be input. After the terminal receives the access password input by the user, in response to the user's connection operation, the terminal proceeds to connect to the first Wi-Fi hotspot based on the obtained encryption manner of the first Wi-Fi hotspot and the SSID and the access password of the first Wi-Fi hotspot. In this case, the user does not need to attempt to successively use encryption manners in the foregoing "security" list to connect to the Wi-Fi hotspot. This can reduce operations performed by the user when the terminal connects to the Wi-Fi hotspot, shorten a time for the terminal to connect to the Wi-Fi hotspot, and improve user experience.

Generally, after the user inputs the SSID of the first Wi-Fi hotspot on the first screen shown in FIG. 8B, the corresponding "password" input window is not displayed on the first screen. If the user is unfamiliar with a hidden hotspot connection manner, the user may directly tap the "connect" button 805 shown in FIG. 8B. A result is that the terminal fails to connect to the first Wi-Fi hotspot.

Figure 11A:
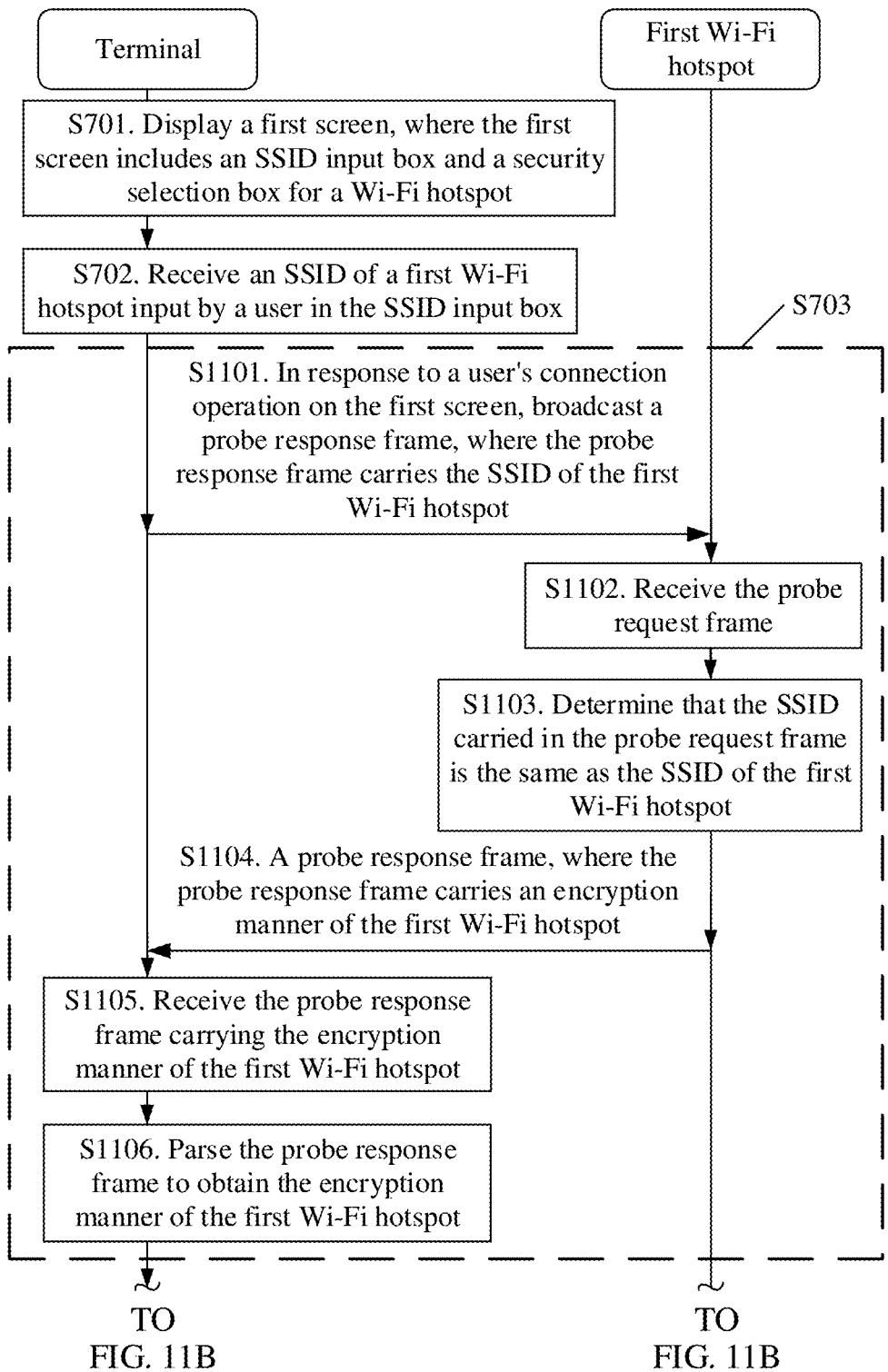
FIG. 11A and FIG. 11B are a flowchart 3 of a Wi-Fi hotspot connection method according to this application.
Figure 11B:
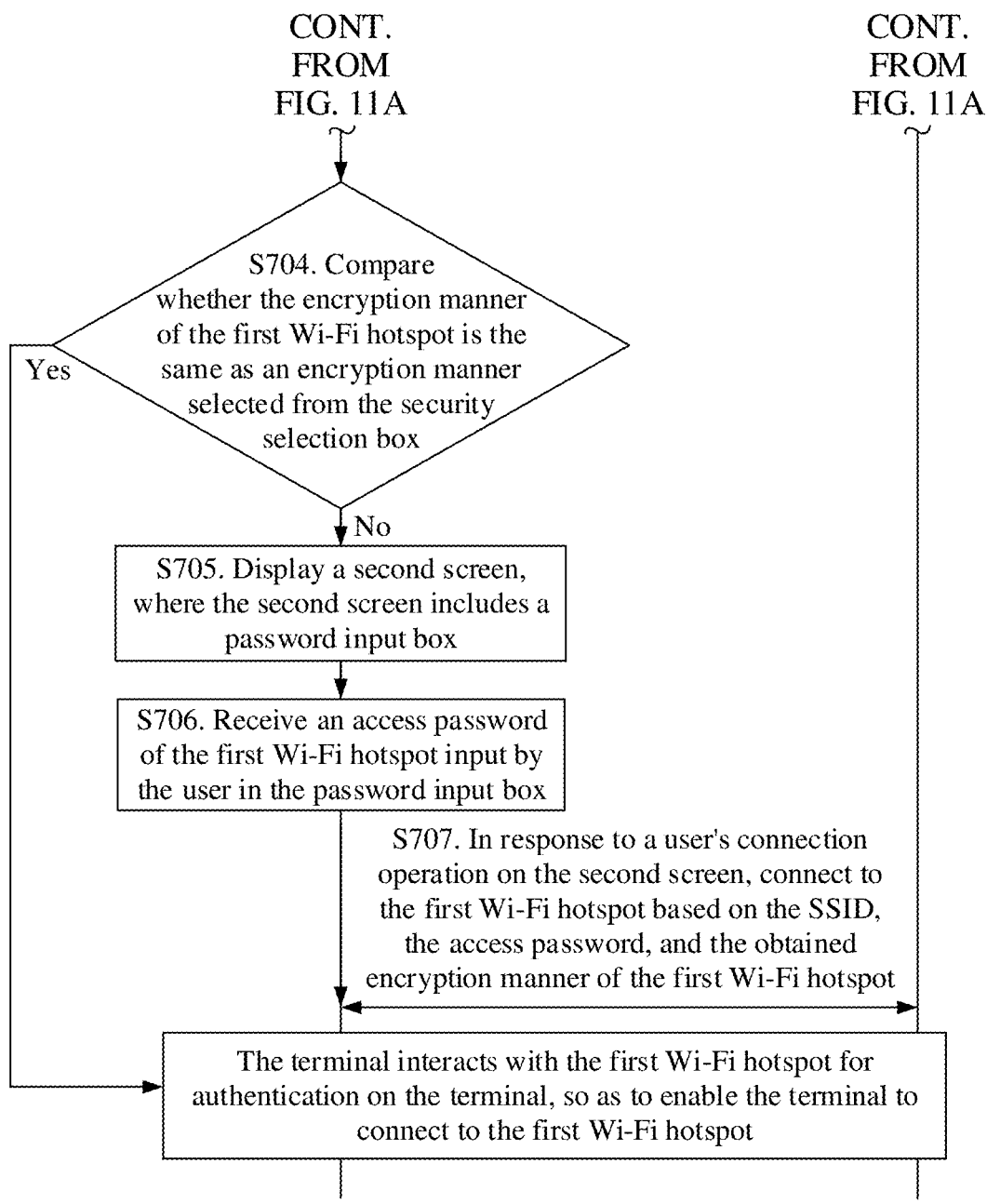

In one embodiment, in response to a user's connection operation on the first screen (for example, a user's tapping operation on the "connect" button 805 on the first screen shown in FIG. 8B), the terminal may obtain the encryption manner of the first Wi-Fi hotspot from the first Wi-Fi hotspot. In one embodiment, as shown in FIG. 11A and FIG. 11B, operation S703 shown in FIG. 7 may be replaced with operations S1101 to S1106.

S1101. In response to the user's connection operation on the first screen, the terminal broadcasts a probe response frame, where the probe response frame carries the SSID of the first Wi-Fi hotspot.

For example, the user's connection operation on the first screen may be the user's tapping operation on the "connect" button 805 on the first screen shown in FIG. 8B. In response to the user's tapping operation on the "connect" button 805 on the first screen shown in FIG. 8B, the mobile phone 100 may broadcast the probe response frame carrying the SSID (such as ABC123) of the first Wi-Fi hotspot.

In one embodiment, the user's connection operation on the first screen may be a user's tapping operation on the "connect" button after the terminal receives the SSID input by the user and the encryption manner selected by the user and receives the access password input by the user.

For example, it is assumed that the SSID of the first Wi-Fi hotspot is ABC123, the encryption manner of the first Wi-Fi hotspot is a WPA/WPA2 PSK manner, and the access password of the first Wi-Fi hotspot is 12345678.

Figure 11C:
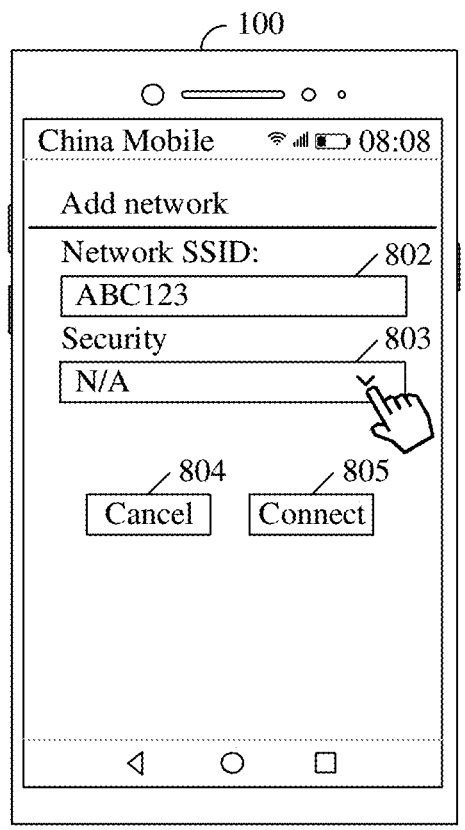
FIG. 11C to FIG. 11F are a schematic diagram 5 of a screen in a scenario of a Wi-Fi hotspot connection method according to this application.
Figure 11D:
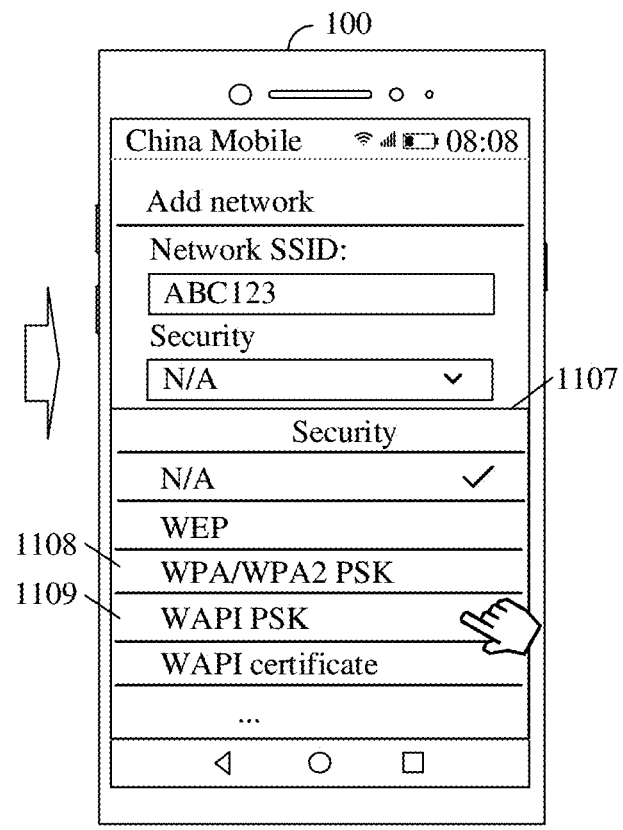
Figure 11F:
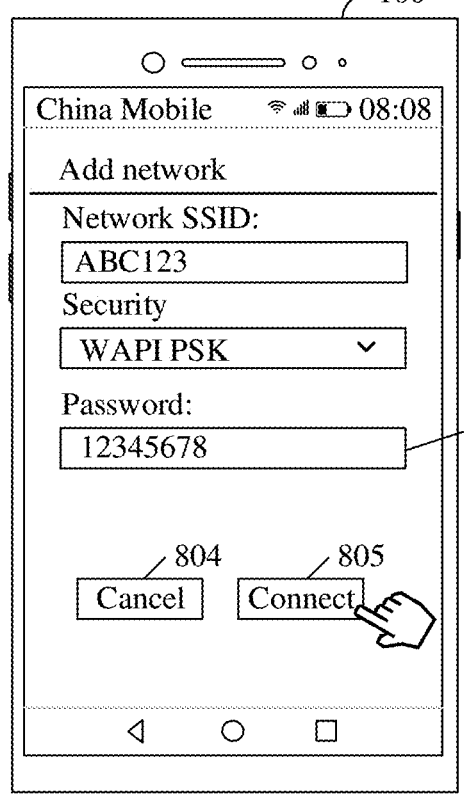
Figure 11E:
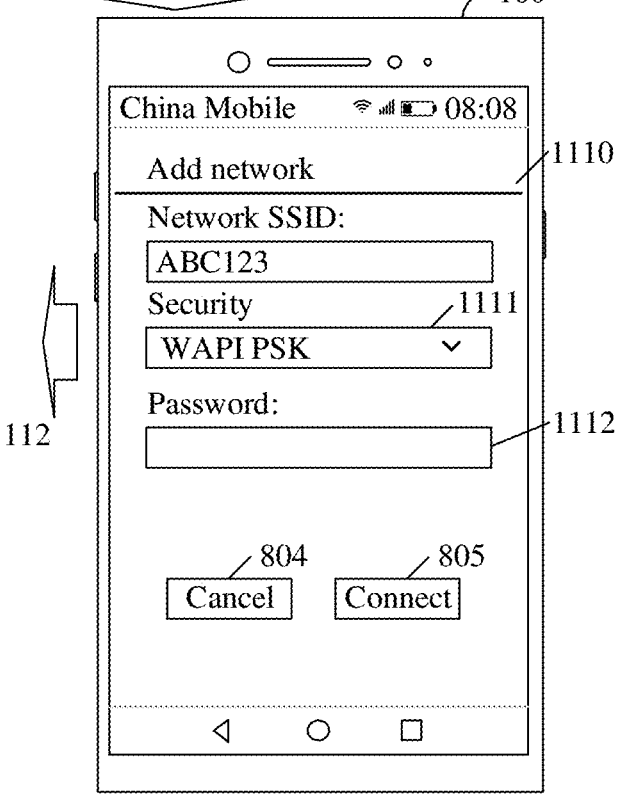

As shown in FIG. 11C to FIG. 11D, after receiving the SSID "ABC123" input by the user in an SSID input box 802 shown in FIG. 11C, in response to a user's tapping operation on a security selection box 803, the mobile phone 100 may display a security list 1107 shown in FIG. 11D. The security list 1107 includes a plurality of encryption manners, and the user may select an encryption manner from the security list 1107 to connect to the first Wi-Fi hotspot. After the user selects an encryption manner "WAPI PSK" 1109 shown in FIG. 11C, in response to the user's operation of selection of the WAPI PSK manner, the mobile phone 100 displays a display screen 1109 shown in FIG. 11E. The display screen 1110 shown in FIG. 11E includes a "security" selection box 1111 in which the encryption manner "WAPI PSK" is displayed and a "password" input window 1112. As shown in FIG. 11F, after the user inputs the access password "12345678" in the "password" input window 1112 and taps a "connect" button 805, in response to the user's tapping operation on the "connect" button 805, the mobile phone 100 may broadcast the probe response frame carrying the SSID "ABC123". To be specific, the first screen may alternatively be a display screen shown in FIG. 11F, and the user's connection operation on the first screen is the user's tapping operation on the "connect" button 805 shown in FIG. 11F.

S1102: The first Wi-Fi hotspot receives the probe request frame.

S1103. The first Wi-Fi hotspot determines that the SSID carried in the probe request frame is the same as the SSID of the first Wi-Fi hotspot.

S1104. The first Wi-Fi hotspot sends a probe response frame to the terminal, where the probe response frame carries the encryption manner of the first Wi-Fi hotspot.

S1105. The terminal receives the probe response frame carrying the encryption manner of the first Wi-Fi hotspot.

S1106. The terminal parses the probe response frame to obtain the encryption manner of the first Wi-Fi hotspot.

It may be figured out that, because the encryption manner "WAPI PSK" 1109 selected by the user from the security list 1106 shown in FIG. 11D is different from the encryption manner "WPA/WPA2 PSK" 1108 of the first Wi-Fi hotspot, after receiving the probe response frame carrying the encryption manner of the first Wi-Fi hotspot, the mobile phone 100 performs operation S704 to determine that the encryption manner (that is, the encryption manner "WAPI PSK" selected by the user) selected from the security selection box is different from the encryption manner "WPA/WPA2 PSK" of the first Wi-Fi hotspot, and then may proceed to perform operations S705 to S707.

In this application, after receiving the SSID input by the user on the first screen, in response to the user's connection operation on the first screen, the terminal may send the probe request frame to obtain the encryption manner of the first Wi-Fi hotspot from the first Wi-Fi hotspot. In this case, the user does not need to remember the encryption manner of the Wi-Fi hotspot or attempt to successively use different security information to connect to the Wi-Fi hotspot. This can reduce operations performed by the user when the terminal connects to the Wi-Fi hotspot, shorten a time for the terminal to connect to the Wi-Fi hotspot, improve efficiency of connecting to the Wi-Fi hotspot by the terminal, and improve user experience.

Certainly, some users may be familiar with the hidden hotspot connection manner. As shown in FIG. 11C, after inputting the SSID (for example, ABC123) in the SSID input box 802, a user who is familiar with the hidden hotspot connection manner may proceed to tap the security selection box 803. Generally, in response to the user's tapping operation on the security selection box 803 shown in FIG. 11C, the mobile phone 100 may display the "security" list 1107 shown in FIG. 11D, so that the user selects the encryption manner. However, the user may not know the encryption manner of the first Wi-Fi hotspot, and cannot select the correct encryption manner from the "security" list 1107.

Figure 12:
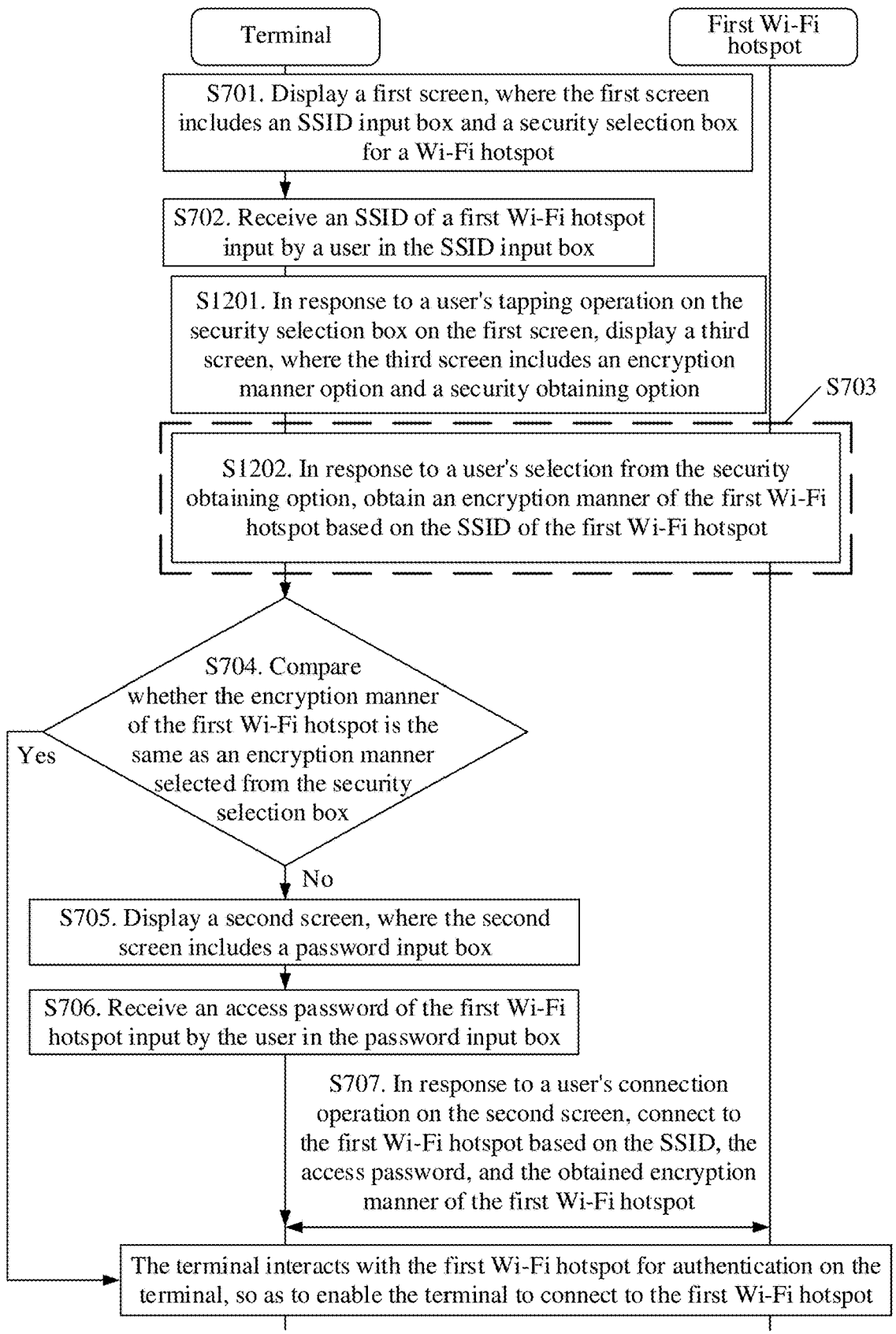
FIG. 12 is a flowchart 4 of a Wi-Fi hotspot connection method according to this application.

In one embodiment, in response to the user's tapping operation on the security selection box, the terminal may display the "security" list including a security obtaining option. In response to a user's tapping operation on the security obtaining option, the terminal may automatically obtain the encryption manner of the first Wi-Fi hotspot. Specifically, as shown in FIG. 12, before operation S703 shown in FIG. 7 is performed, the method in this application may further include operation S1201, and operation S703 shown in FIG. 7 may be replaced with operation S1202.

S1201. In response to a user's tapping operation on the security selection box on the first screen, the terminal displays a third screen, where the third screen includes an encryption manner option and a security obtaining option.

Figure 13A:
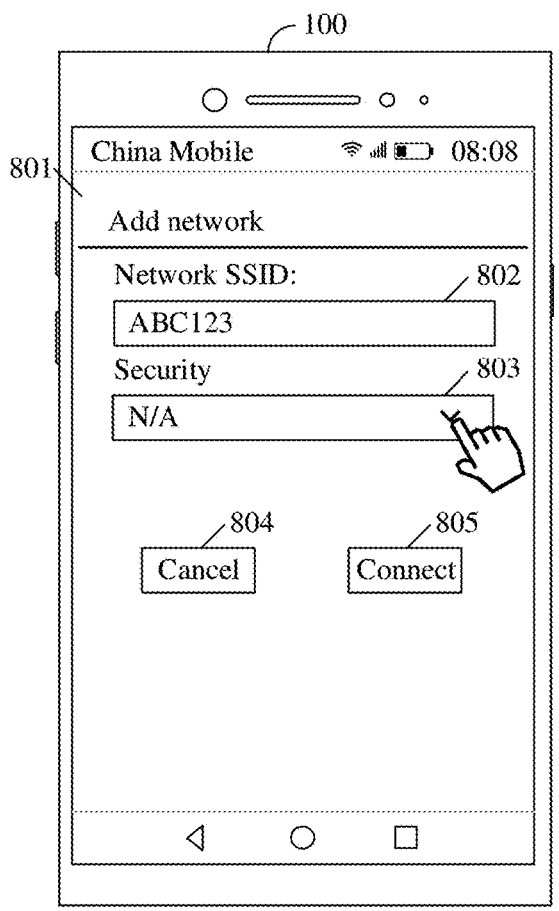
FIG. 13A and FIG. 13B are a schematic diagram 6 of a screen in a scenario of a Wi-Fi hotspot connection method according to this application.

The security selection box in this application may be a security selection box 803 on a first screen 801 shown in FIG. 13A. For example, the mobile phone 100 is used as the terminal. In response to a user's tapping operation on the security selection box 803 shown in FIG. 13A, the mobile phone 100 may display a third screen 1301 shown in FIG. 13B. The third screen 1301 shown in FIG. 13B includes a "security" obtaining option 1302 and encryption manners such as WEP and WPA/WPA2 PSK.

Figure 13B:
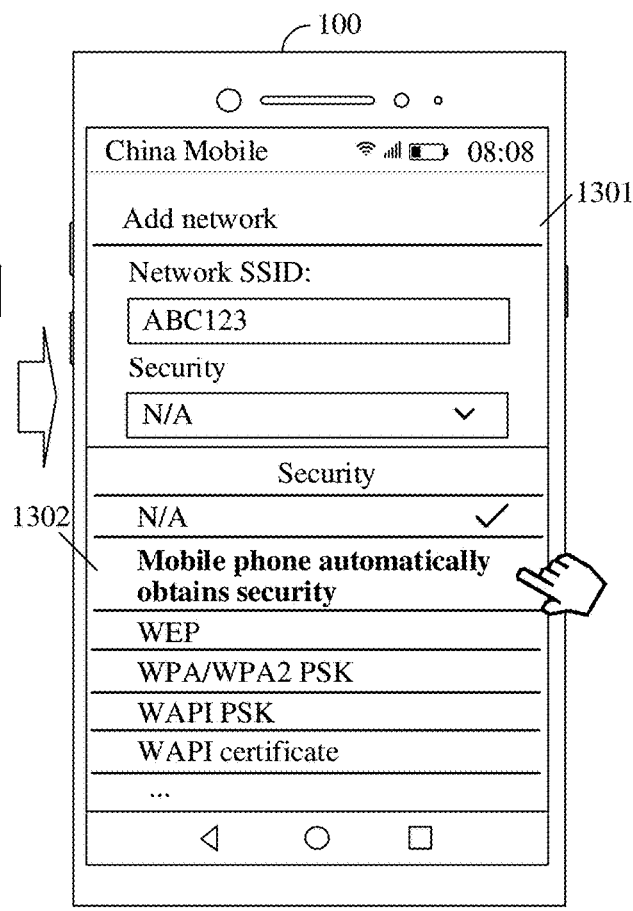

For example, as shown in FIG. 13B, information indicating "the mobile phone automatically obtains security" may be displayed in the "security" obtaining option 1302, to prompt the user to tap the "security" obtaining option 1302 to trigger the mobile phone to automatically obtain the encryption manner of the Wi-Fi hotspot.

S1202. In response to a user's selection from the security obtaining option, the terminal obtains the encryption manner of the first Wi-Fi hotspot based on the SSID of the first Wi-Fi hotspot.

For example, after the user taps the "security" obtaining option 1302 shown in FIG. 13B, the mobile phone 100 may obtain the encryption manner of the first Wi-Fi hotspot, and then perform operations S704 to S707.

It should be noted that, the encryption manners (namely, the foregoing encryption manner option) such as WEP and WPA/WPA2 PSK on the third screen 1301 shown in FIG. 13B are optional. The third screen may include only the security obtaining option, but does not include the encryption manner option.

In response to the user's selection from the security obtaining option, the terminal may obtain the encryption manner of the first Wi-Fi hotspot from the cloud server based on the SSID of the first Wi-Fi hotspot. For a method in which the terminal obtains the encryption manner of the first Wi-Fi hotspot from the cloud server, refer to related descriptions after operation S703 is performed in this application. Details are not described herein again in this application.

Alternatively, in response to the user's selection from the security obtaining option, the terminal may broadcast a probe response frame to obtain the encryption manner of the first Wi-Fi hotspot from the first Wi-Fi hotspot. For a method in which the terminal broadcasts the probe response frame to obtain the encryption manner of the first Wi-Fi hotspot from the first Wi-Fi hotspot, refer to related descriptions in operations S1101 to S1106 in this application. Details are not described herein again in this application.

In this application, after receiving the SSID input by the user on the first screen, in response to the user's tapping operation on the security selection box on the first screen, the terminal may display the third screen. Because the third screen includes the encryption manner option and the security obtaining option, even if the user does not know the encryption manner of the first Wi-Fi hotspot, the user may also tap the security obtaining option, so that the terminal automatically obtains the encryption manner of the first Wi-Fi hotspot in response to the user's tapping operation on the security obtaining option. This can reduce operations performed by the user when the terminal connects to the Wi-Fi hotspot, shorten a time for the terminal to connect to the Wi-Fi hotspot, improve efficiency of connecting to the Wi-Fi hotspot by the terminal, and improve user experience.

Figure 14:
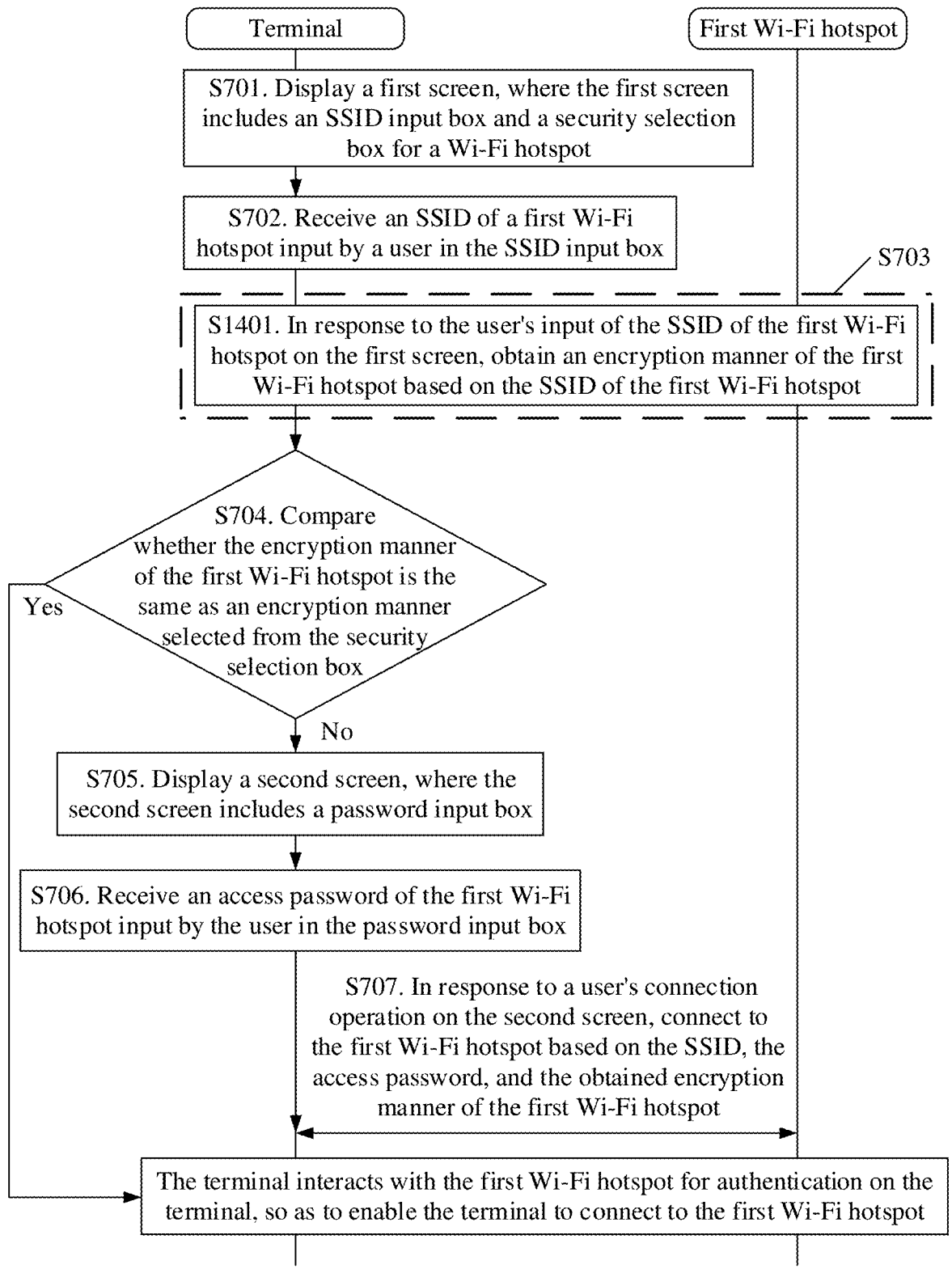
FIG. 14 is a flowchart 5 of a Wi-Fi hotspot connection method according to this application.

In one embodiment, after the terminal receives the SSID of the first Wi-Fi hotspot input by the user on the first screen (to be specific, after operation S702 is performed), even though the terminal does not receive the user's tapping operation on the "security" selection box or does not receive the user's tapping operation on the "connect" button, the terminal may also perform operation S703 to obtain the encryption manner of the first Wi-Fi hotspot. Specifically, in response to the operation that "the user inputs the SSID of the first Wi-Fi hotspot on the first screen", the terminal may obtain the encryption manner of the first Wi-Fi hotspot based on the SSID of the first Wi-Fi hotspot. To be specific, in response to the operation that "the user inputs the SSID of the first Wi-Fi hotspot on the first screen", the terminal may further perform operation S703. Specifically, as shown in FIG. 14, operation S703 shown in FIG. 7 may be replaced with operation S1401.

S1401. In response to the user's input of the SSID of the first Wi-Fi hotspot on the first screen, the terminal obtains the encryption manner of the first Wi-Fi hotspot based on the SSID of the first Wi-Fi hotspot.

Figures 15A, 15B:
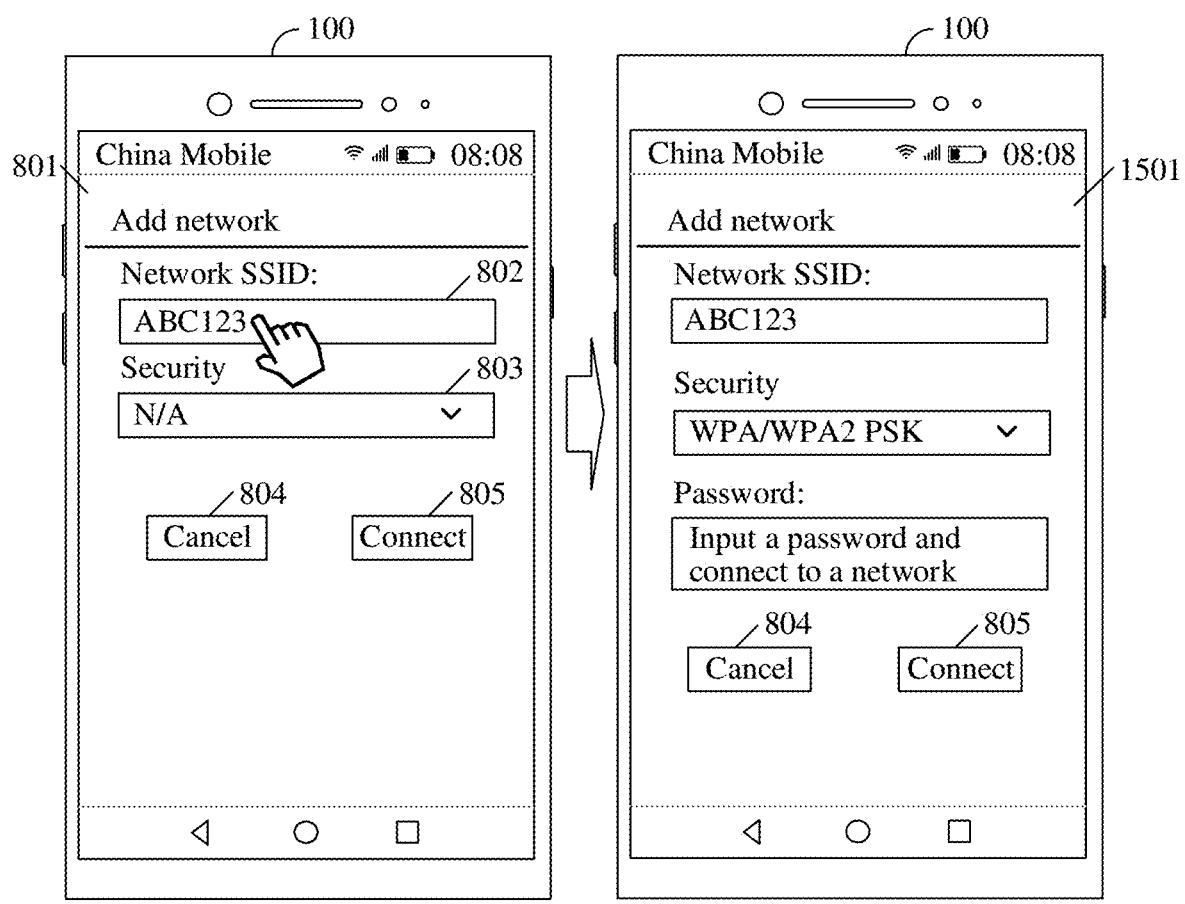
FIG. 15A and FIG. 15B are a schematic diagram 7 of a screen in a scenario of a Wi-Fi hotspot connection method according to this application.

For example, after the mobile phone 100 detects the SSID (for example, ABC123) of the first Wi-Fi hotspot input by the user on a first screen 801 shown in FIG. 15A, the mobile phone 100 may obtain the encryption manner of the first Wi-Fi hotspot based on the SSID of the first Wi-Fi hotspot.

Referring to a security selection box 803 shown in FIG. 15A, a default encryption manner N/A of the mobile phone 100 is shown in the security selection box 803. Therefore, when obtaining the encryption manner of the first Wi-Fi hotspot, the mobile phone 100 may perform operation S704, and learn that the encryption manner of the first Wi-Fi hotspot is different from the default encryption manner. In this case, the mobile phone 100 may display a second screen. For example, the mobile phone 100 may display a second screen 1501 shown in FIG. 15B. In one embodiment, the second screen 1501 shown in FIG. 15B may be replaced with the second screen 901 shown in FIG. 9.

For example, from the operation in which the terminal detects that the user starts to input the SSID in an SSID input box 802, if the terminal detects no character input by the user in the SSID input box 802 within a preset time after the terminal detects that the user inputs one character in the SSID input box 802, the terminal may perform operation S1401 to obtain the encryption manner of the first Wi-Fi hotspot based on the SSID that includes all characters input in the SSID input box 802. After the terminal performs operation S1401, if the terminal further detects that the user continues to input a character in the SSID input box 802, the terminal may perform operation S1401 again to obtain the encryption manner of the first Wi-Fi hotspot based on the SSID that includes all characters input in the SSID input box 802.

In response to receiving of the SSID of the first Wi-Fi hotspot input by the user on the first screen, the terminal may obtain the encryption manner of the first Wi-Fi hotspot from the cloud server based on the SSID of the first Wi-Fi hotspot. For a method in which the terminal obtains the encryption manner of the first Wi-Fi hotspot from the cloud server, refer to related descriptions after operation S703 is performed in this application. Details are not described herein again in this application.

Alternatively, in response to receiving of the SSID of the first Wi-Fi hotspot input by the user on the first screen, the terminal may broadcast a probe response frame to obtain the encryption manner of the first Wi-Fi hotspot from the first Wi-Fi hotspot. For a method in which the terminal broadcasts the probe response frame to obtain the encryption manner of the first Wi-Fi hotspot from the first Wi-Fi hotspot, refer to related descriptions in operations S1101 to S1106 in this application. Details are not described herein again in this application.

In this application, after the terminal receives the SSID input by the user on the first screen, even if the terminal does not receive the user's tapping operation in the "security" selection box or does not receive the user's tapping operation on the "connect" button, in response to the operation that "the user inputs the SSID of the first Wi-Fi hotspot on the first screen", the terminal may also directly obtain the encryption manner of the first Wi-Fi hotspot. To be specific, in this application, the terminal may further automatically obtain the encryption manner of the first Wi-Fi hotspot in a manner in which the encryption manner of the Wi-Fi hotspot is imperceptible to the user.

It may be understood that, after the terminal displays the second screen (that is, after operation S705 is performed), and before the terminal receives the access password of the first Wi-Fi hotspot input by the user on the second screen (that is, before operation S706 is performed), even if the terminal responds to the user's connection operation on the second user screen, the terminal still cannot succeed in connecting to the Wi-Fi hotspot because the user has not input the access password of the Wi-Fi hotspot on the second screen. Therefore, in this application, after the terminal displays the second screen, and before the terminal receives the access password of the first Wi-Fi hotspot input by the user on the second screen, the terminal does not respond to the user's connection operation on the second screen, in other words, the terminal does not respond to the user's tapping operation on the "connect" button on the second screen.

Figure 16A:
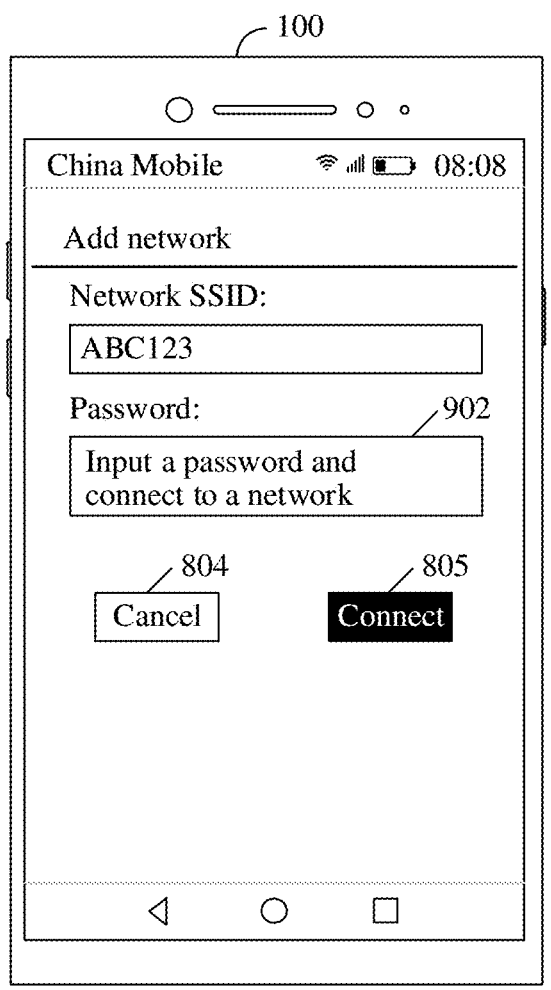
FIG. 16A and FIG. 16B are a schematic diagram 8 of a screen in a scenario of a Wi-Fi hotspot connection method according to this application.

For example, when the user has not input the access password in a "password" input window 902, the mobile phone 100 may display, on a second screen, a "connect" button 805 in an inoperable state shown in FIG. 16A. The mobile phone 100 does not respond to any user's operation on the "connect" button 805 shown in FIG. 16A.

Figure 16B:
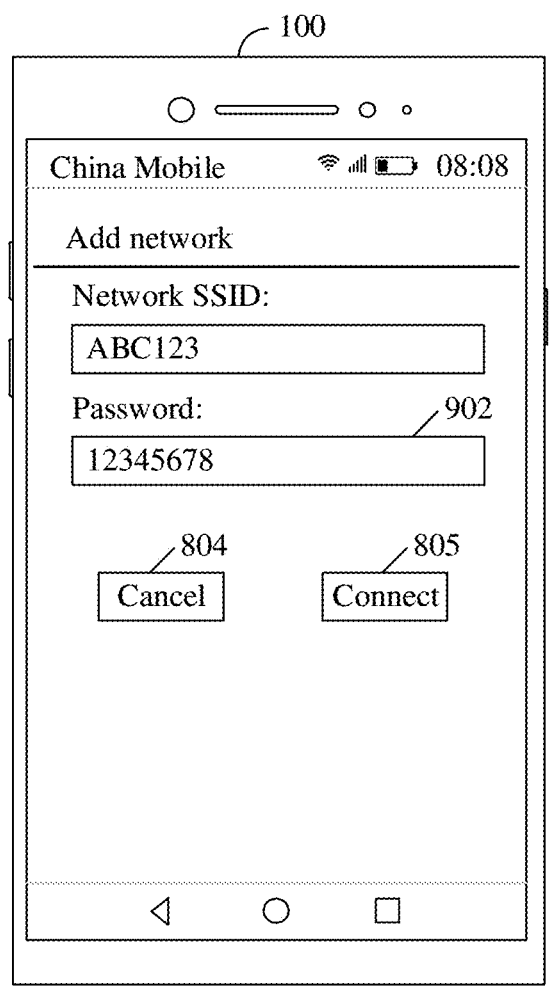

As shown in FIG. 16B, after the user inputs the access password in a "password" input window 902, a "connect" button 805 is switched to an operable state. In response to a user's tapping operation on the "connect" button 805 shown in FIG. 16B, the mobile phone 100 connects to the Wi-Fi hotspot.

This application provides the Wi-Fi hotspot connection method. The terminal may automatically obtain the security information of the first Wi-Fi hotspot, and the user does not need to remember the security information or attempt to successively use different security information to connect to a network. This can reduce operations performed by the user when the terminal connects to the Wi-Fi hotspot, shorten a time for the terminal to connect to the Wi-Fi hotspot, and improve user experience.

It can be understood that, to implement the foregoing functions, the terminal and the like include corresponding hardware structures and/or software modules for performing the functions. Persons skilled in the art should be easily aware that, in the embodiments of the present invention, the units and algorithm operations in the examples described with reference to the embodiments disclosed in this specification can be implemented by hardware or a combination of hardware and computer software. Whether a function is performed by hardware or hardware driven by computer software depends on particular applications and design constraints of the technical solutions. Persons skilled in the art may use different methods to implement the described functions for each particular application, but it should not be considered that the implementation goes beyond the scope of the embodiments of the present invention.

In the embodiments of this application, the terminal may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that the module division in the embodiments of the present invention is an example, and is merely logical function division. There may be another division manner in some embodiments.

Figure 17:
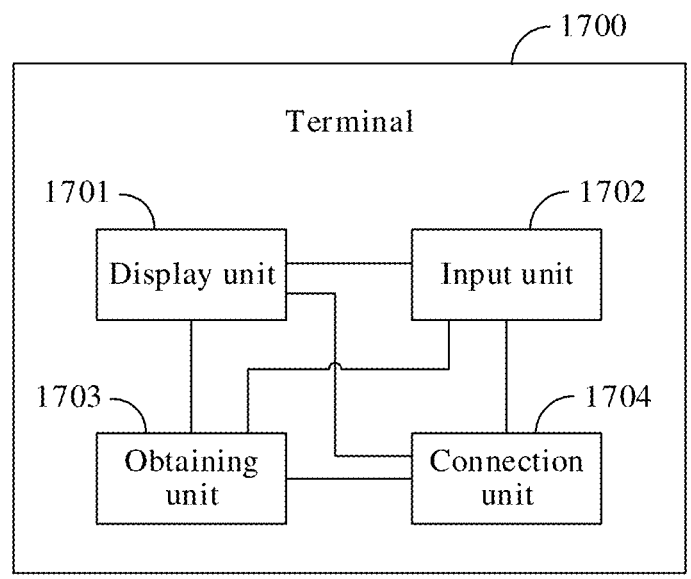
FIG. 17 is a schematic structural diagram 1 of a terminal according to this application.

When functional modules corresponding to various functions are obtained through division, FIG. 17 is a possible schematic structural diagram of a terminal in the foregoing embodiments. As shown in FIG. 17, the terminal 1700 includes a display unit 1701, an input unit 1702, an obtaining unit 1703, and a connection unit 1704. The display unit 1701 is configured to support the terminal in performing operation S701, operation S705, and operation S1201 in the method embodiment, and/or is configured to perform another process of the technology described in this specification. The input unit 1702 is configured to support the terminal in performing operation S702, and operation S706 in the method embodiment, and/or is configured to perform another process of the technology described in this specification. The obtaining unit 1703 is configured to support the terminal in performing operation S703, operation S1202, operation S1401, operation S1101, and operations 1104 to S1106 in the method embodiment, and/or is configured to perform another process of the technology described in this specification. The connection unit 1704 is configured to support the terminal in performing operation S301, operation S303, operations 305 to S307, and operation 707 in the method embodiment, and/or is configured to perform another process of the technology described in this specification.

All related content of the operations in the foregoing method embodiment may be cited in function descriptions of corresponding functional modules. Details are not described herein again.

Certainly, the terminal 1700 includes but is not limited to the unit modules listed above. For example, the terminal 1700 may further include a storage unit, and the storage unit is configured to store an SSID, an encryption manner, and an access password of a Wi-Fi hotspot to which the terminal has connected. The storage unit may be further configured to store the first screen, a second screen, and the like. The terminal 1700 may further include a comparing unit. The comparing unit is configured to support the terminal in performing operation S304, and operation S704 in the method embodiment, and/or is configured to perform another process of the technology described in this specification.

In addition, functions that the functional units can specifically implement include but are not limited to the functions corresponding to the method operations in the foregoing examples. For detailed descriptions about other units of the terminal 1700, refer to the detailed descriptions about the method operations corresponding to the units. Details are not described herein again in this embodiment of this application.

When an integrated unit is used, the input unit 2101, a calculation unit, and the like may be integrated into one processing module for implementation. For example, the connection unit 1704 may be a Wi-Fi module (for example, the Wi-Fi apparatus 607 shown in FIG. 6) in the terminal. When the terminal obtains from a first Wi-Fi hotspot, an encryption manner of the first Wi-Fi hotspot, the obtaining unit 1703 may also be a Wi-Fi module (for example, the Wi-Fi apparatus 607 shown in FIG. 6) in the terminal. When the terminal obtains from a cloud server, the encryption manner of the first Wi-Fi hotspot, the obtaining unit 1703 may be any one of a Bluetooth module (for example, the Bluetooth apparatus 605 in the mobile phone 100 shown in FIG. 6), an RF circuit (for example, the radio frequency circuit 602 shown in FIG. 6), or a Wi-Fi module (for example, the Wi-Fi apparatus 607 shown in FIG. 6) in the terminal. The obtaining unit 1703 and the connection unit 1704 may be collectively referred to as a communications module. The input module 1702 may be a processing module. The storage unit may be a storage module (for example, the memory 603 shown in FIG. 6) in the terminal, and the display unit may be a display module, for example, a touchscreen (for example, the touchscreen 604 shown in FIG. 6).

Figure 18:
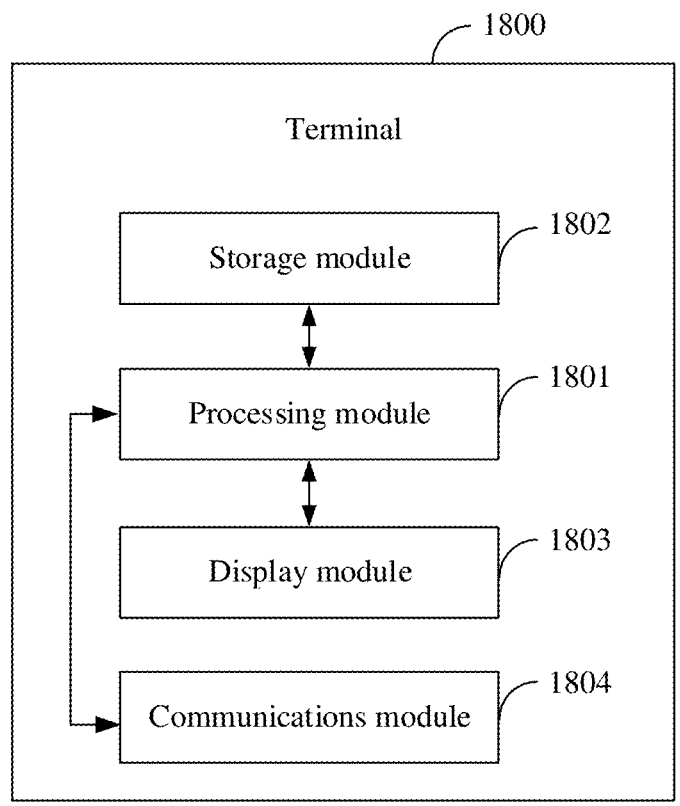
FIG. 18 is a schematic structural diagram 2 of a terminal according to this application.

FIG. 18 is a possible schematic structural diagram of a terminal in the foregoing embodiment. The terminal 1800 includes a processing module 1801, a storage module 1802, a display module 1803, and a communications module 1804. The processing module 1801 is configured to perform control management on an action of the terminal. The display module 1803 is configured to display an image generated by the processing module 1801, for example, a first screen and a second screen. The storage module 1802 is configured to store program code and data of the terminal. The communications module 1804 is configured to communicate with another terminal. For example, the communications module 1804 is configured to interact with a first Wi-Fi hotspot to be accessed the first Wi-Fi hotspot. The communications module 1804 is configured to interact with a cloud server to obtain an encryption manner of the first Wi-Fi hotspot. The processing module 1801 may be a processor or a controller, for example, may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processing module 1801 may implement or execute various example logical blocks, modules, and circuits described with reference to content disclosed in the present invention. Alternatively, the processor may be a combination for implementing a computing function, for example, a combination of one or more microprocessors, or a combination of the DSP and a microprocessor. The communications module 1804 may be a transceiver, a transceiver circuit, a communications interface, or the like. The storage module 1802 may be a memory.

When the processing module 1801 is the processor (for example, the processor 601 shown in FIG. 6), the communications module 1804 is an RF transceiver circuit (for example, the radio frequency circuit 602 shown in FIG. 6), and the storage module 1802 is a memory (for example, the memory 603 shown in FIG. 6). When the display module 1803 is a touchscreen (including the touchpad 604-1 and the display 604-2 shown in FIG. 6), the terminal provided in this embodiment of the present invention may be the terminal 100 shown in FIG. 6. The communications modules 1804 may include not only the RF circuit, but also a Wi-Fi module and a Bluetooth module. The communications modules such as the RF circuit, the Wi-Fi module, and the Bluetooth module may be collectively referred to as a communications interface. The processor, the communications interface, the touchscreen, and the storage area may be coupled together by using a bus.

This application further provides a computer storage medium, where the computer storage medium stores computer program code, and when the processor executes the computer program code, the terminal performs related method operations in any one of FIG. 3, FIG. 7, FIG. 11A and FIG. 11B, FIG. 12, and FIG. 14 to implement the Wi-Fi hotspot connection method in the foregoing embodiments.

This application further provides a computer program product. When the computer program product is run on a computer, the computer is enabled to perform related method operations in any one of FIG. 3, FIG. 7, FIG. 11A and FIG. 11B, FIG. 12, and FIG. 14 to implement the Wi-Fi hotspot connection method in the foregoing embodiments.

The terminal 1700, the terminal 1800, the computer storage medium, and the computer program product provided in this application are all configured to perform the corresponding methods provided in the foregoing. Therefore, for beneficial effects that can be achieved by the terminal 1700, the terminal 1800, the computer storage medium, and the computer program product, refer to the beneficial effects of the corresponding methods provided in the foregoing. Details are not described herein again.

The foregoing descriptions about embodiments allow persons skilled in the art to understand that, for the purpose of convenient and brief description, division of the foregoing functional modules is used as an example for illustration. In one embodiment, the foregoing functions may be allocated to different functional modules and implemented as required, to be specific, an inner structure of an apparatus is divided into different functional modules to implement all or some of the functions described above. For a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the module or unit division is merely logical function division, and there may be another division manner in some embodiments. For example, a plurality of units or components may be combined or integrated into another system, or some features may be ignored or not performed. In addition, displayed or discussed mutual couplings or direct couplings or communication connections may be indirect couplings or communication connections using some interfaces, apparatuses, or units, and may have an electrical form, a mechanical form, or another form.

The units described as separate parts may or may not be physically separate; and parts displayed as units may or may not be physical units, in other words, may be located in one position, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units may be integrated into one unit. The integrated units may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device, or the like) or a processor to perform all or some of the operations of the methods described in the embodiments of this application. The foregoing storage medium includes any medium that can store program code, such as a flash memory, a removable hard disk, a read-only memory, a random access memory, a magnetic disk, or an optical disc.

The foregoing descriptions are merely specific embodiments of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A Wi-Fi hotspot connection method, wherein the method comprises:
    displaying, by a terminal, a first screen, wherein the first screen comprises a service set identifier (SSID) input box and a security selection box for a wireless fidelity (Wi-Fi) hotspot and the first screen does not comprise a password input box;
    receiving, by the terminal, an SSID of a first Wi-Fi hotspot input by a user in the SSID input box and an encryption manner selected from the security selection box is an encryption manner input by default and the encryption manner input by default is N/A;
    in response to the user's first connection operation on the first screen, obtaining, by the terminal, an encryption manner of the first Wi-Fi hotspot based on the SSID of the first Wi-Fi hotspot, wherein the user's first connection operation is used to instruct the terminal to connect to the first Wi-Fi hotspot;
    displaying, by the terminal, a second screen if the obtained encryption manner of the first Wi- Fi hotspot is different from an encryption manner selected from the security selection box, wherein the second screen comprises a password input box;
    receiving, by the terminal, an access password of the first Wi-Fi hotspot input by the user in the password input box; and
    in response to the user's second connection operation on the second screen, connecting, by the terminal, to the first Wi-Fi hotspot based on the SSID, the access password, and the obtained encryption manner of the first Wi-Fi hotspot, wherein the user's second connection operation is used to instruct the terminal to connect to the first Wi-Fi hotspot.

2. The method according to claim 1, wherein before the obtaining, by the terminal, the encryption manner of the first Wi-Fi hotspot based on the SSID of the first Wi- Fi hotspot, the method further comprises:
    in response to the user's selection operation on the security selection box, displaying, by the terminal, a third screen, wherein the third screen comprises an encryption manner option and a security obtaining option; and
    the obtaining, by the terminal, an encryption manner of the first Wi-Fi hotspot based on the SSID of the first Wi-Fi hotspot comprises:
    in response to the user's selection from the security obtaining option, obtaining, by the terminal, the encryption manner of the first Wi-Fi hotspot based on the SSID of the first Wi-Fi hotspot.

3. The method according to claim 2, wherein the obtaining, by the terminal, the encryption manner of the first Wi-Fi hotspot based on the SSID of the first Wi-Fi hotspot comprises:
    sending, by the terminal, an encryption manner obtaining request to a cloud server, wherein the encryption manner obtaining request carries the SSID of the first Wi-Fi hotspot, and the cloud server stores encryption manners of a plurality of Wi-Fi hotspots; and
    receiving, by the terminal, an encryption manner obtaining response sent by the cloud server, wherein the encryption manner obtaining response carries the SSID of the first Wi-Fi hotspot.

4. The method according to claim 1, wherein the obtaining, by the terminal, the encryption manner of the first Wi-Fi hotspot based on the SSID of the first Wi-Fi hotspot comprises:
    after responding to the user's input of the SSID of the first Wi-Fi hotspot on the first screen, automatically obtaining, by the terminal, the encryption manner of the first Wi-Fi hotspot based on the SSID of the first Wi-Fi hotspot.

5. The method according to claim 1, wherein the obtaining, by the terminal, the encryption manner of the first Wi-Fi hotspot based on the SSID of the first Wi-Fi hotspot comprises:
    broadcasting, by the terminal, a probe request frame, wherein the probe request frame carries the SSID of the first Wi-Fi hotspot;
    receiving, by the terminal, a probe response frame sent by the first Wi-Fi hotspot, wherein the probe response frame carries the encryption manner of the first Wi-Fi hotspot; and
    parsing, by the terminal, the probe response frame to obtain the encryption manner of the first Wi-Fi hotspot.

6. The method according to claim 1, wherein the method comprises:
    saving the encryption manner of the first Wi-Fi hotspot.

7. The method according to claim 1, wherein the encryption manner input by default is unencrypted.

8. The method according to claim 1, wherein the first screen is hotspot addition screen.

9. A terminal, wherein the terminal comprises a processor, a memory, a touchscreen, and a communications interface, the memory, the touchscreen, and the communications interface are coupled to the processor, the communications interface is configured to communicate with another terminal, the another terminal comprises a wireless fidelity (Wi-Fi) hotspot, the memory is configured to store computer program code, the computer program code comprises a computer instruction, and when the processor executes the computer instruction, the touchscreen is configured to display a first screen, wherein the first screen comprises a service set identifier (SSID) input box and a security selection box for the Wi-Fi hotspot, and the first screen does not comprise a password input box;

the processor is configured to: receive an SSID of a first Wi-Fi hotspot input by a user in the SSID input box displayed on the touchscreen, and an encryption manner selected from the security selection box is an encryption manner input by default and the encryption manner input by default is N/A, and in response to the user's first connection operation on the first screen displayed on the touchscreen, obtain an encryption manner of the first Wi-Fi hotspot based on the SSID of the first Wi-Fi hotspot, wherein the user's first connection operation is used to instruct the terminal to connect to the first Wi-Fi hotspot;

wherein the touchscreen is further configured to: in response to selection of the SSID by the user, display a second screen if the encryption manner of the first Wi-Fi hotspot obtained by the processor is different from an encryption manner selected from the security selection box, wherein the second screen comprises a password input box;

the processor is further configured to receive an access password of the first Wi-Fi hotspot input by the user in the password input box displayed on the touchscreen; and the processor is further configured to: in response to the user's second connection operation on the second screen, connect to the first Wi-Fi hotspot based on the SSID, the access password, and the obtained encryption manner of the first Wi-Fi hotspot through the communications interface, wherein the user's second connection operation is used to instruct the terminal to connect to the first Wi-Fi hotspot.

10. The terminal according to claim 9, wherein the touchscreen is further configured to: before the processor obtains the encryption manner of the first Wi-Fi hotspot based on the SSID of the first Wi-Fi hotspot, in response to the user's selection operation on the security selection box on the first screen, display a third screen, wherein the third screen comprises an encryption manner option and a security obtaining option; and the processor is further configured to: in response to the user's selection from the security obtaining option displayed on the touchscreen, obtain the encryption manner of the first Wi-Fi hotspot based on the SSID of the first Wi-Fi hotspot.

11. The terminal according to claim 10, wherein the communications interface is further configured to: send an encryption manner obtaining request to a cloud server, wherein the encryption manner obtaining request carries the SSID of the first Wi-Fi hotspot, and the cloud server stores encryption manners of a plurality of Wi-Fi hotspots; and receive an encryption manner obtaining response sent by the cloud server, wherein the encryption manner obtaining response carries the SSID of the first Wi-Fi hotspot.

12. The terminal according to claim 9, wherein the processor is further configured to: after responding to the user's input of the SSID of the first Wi-Fi hotspot on the first screen displayed on the touchscreen, automatically obtain the encryption manner of the first Wi-Fi hotspot based on the SSID of the first Wi-Fi hotspot.

13. The terminal according to claim 9, wherein the communications interface is further configured to: broadcast a probe request frame, wherein the probe request frame carries the SSID of the first Wi-Fi hotspot; and receive a probe response frame sent by the first Wi-Fi hotspot, wherein the probe response frame carries the encryption manner of the first Wi-Fi hotspot; and the processor is further configured to parse the probe response frame received through the communications interface, to obtain the encryption manner of the first Wi-Fi hotspot.

14. The terminal according to claim 9, wherein the processor is further configured to save the encryption manner of the first Wi-Fi hotspot.

15. The terminal according to claim 9, wherein the encryption manner input by default is unencrypted.

16. A non-transitory computer readable storage medium, comprising a computer instruction, wherein when the computer instruction is run on a terminal, the terminal is enabled to perform a Wi-Fi hotspot connection method comprising: displaying, by the terminal, a first screen, wherein the first screen comprises a service set identifier (SSID) input box and a security selection box for a wireless fidelity (Wi-Fi) hotspot and the first screen does not comprise a password input box; receiving, by the terminal, an SSID of a first Wi-Fi hotspot input by a user in the SSID input box and an encryption manner selected from the security selection box is an encryption manner input by default and the encryption manner input by default is N/A; in response to the user's first connection operation on the first screen, obtaining, by the terminal, an encryption manner of the first Wi-Fi hotspot based on the SSID of the first Wi-Fi hotspot, wherein the user's first connection operation is used to instruct the terminal to connect to the first Wi-Fi hotspot; displaying, by the terminal, a second screen if the obtained encryption manner of the first Wi-Fi hotspot is different from an encryption manner selected from the security selection box, wherein the second screen comprises a password input box; receiving, by the terminal, an access password of the first Wi-Fi hotspot input by the user in the password input box; and in response to the user's second connection operation on the second screen, connecting, by the terminal, to the first Wi-Fi hotspot based on the SSID, the access password, and the obtained encryption manner of the first Wi-Fi hotspot, wherein the user's second connection operation is used to instruct the terminal to connect to the first Wi-Fi hotspot.

17. The computer readable storage medium of claim 16, wherein before the obtaining, by the terminal, the encryption manner of the first Wi-Fi hotspot based on the SSID of the first Wi-Fi hotspot, the method further comprises:

in response to the user's selection operation on the security selection box, displaying, by the terminal, a third screen, wherein the third screen comprises an encryption manner option and a security obtaining option; and the obtaining, by the terminal, an encryption manner of the first Wi-Fi hotspot based on the SSID of the first Wi-Fi hotspot comprises:

in response to the user's selection from the security obtaining option, obtaining, by the terminal, the encryption manner of the first Wi-Fi hotspot based on the SSID of the first Wi-Fi hotspot.

18. The computer readable storage medium of claim 17, wherein the obtaining, by the terminal, the encryption manner of the first Wi-Fi hotspot based on the SSID of the first Wi-Fi hotspot comprises:

sending, by the terminal, an encryption manner obtaining request to a cloud server, wherein the encryption manner obtaining request carries the SSID of the first Wi-Fi hotspot, and the cloud server stores encryption manners of a plurality of Wi-Fi hotspots; and receiving, by the terminal, an encryption manner obtaining response sent by the cloud server, wherein the encryption manner obtaining response carries the SSID of the first Wi-Fi hotspot.

19. The computer readable storage medium of claim 16, wherein the obtaining, by the terminal, the encryption manner of the first Wi-Fi hotspot based on the SSID of the first Wi-Fi hotspot comprises:

after responding to the user's input of the SSID of the first Wi-Fi hotspot on the first screen, automatically obtaining, by the terminal, the encryption manner of the first Wi-Fi hotspot based on the SSID of the first Wi-Fi hotspot.

20. The computer readable storage medium of claim 16, wherein the obtaining, by the terminal, the encryption manner of the first Wi-Fi hotspot based on the SSID of the first Wi-Fi hotspot comprises:

broadcasting, by the terminal, a probe request frame, wherein the probe request frame carries the SSID of the first Wi-Fi hotspot;

receiving, by the terminal, a probe response frame sent by the first Wi-Fi hotspot, wherein the probe response frame carries the encryption manner of the first Wi-Fi hotspot; and parsing, by the terminal, the probe response frame to obtain the encryption manner of the first Wi-Fi hotspot.

* * * * *